United States Patent
Zhang et al.

(10) Patent No.: US 11,432,106 B2
(45) Date of Patent: Aug. 30, 2022

(54) SIDE LINK RESOURCE MANAGEMENT

(71) Applicant: HUAWEI TECHNOLOGIES CO., LTD., Shenzhen (CN)

(72) Inventors: Hang Zhang, Nepean (CA); Jaya Rao, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 41 days.

(21) Appl. No.: 17/158,457

(22) Filed: Jan. 26, 2021

(65) Prior Publication Data
US 2021/0235219 A1 Jul. 29, 2021

Related U.S. Application Data

(60) Provisional application No. 62/966,926, filed on Jan. 28, 2020.

(51) Int. Cl.
*H04W 4/021* (2018.01)
*H04W 72/02* (2009.01)
(Continued)

(52) U.S. Cl.
CPC .......... *H04W 4/021* (2013.01); *H04W 28/26* (2013.01); *H04W 72/02* (2013.01); *H04W 92/18* (2013.01)

(58) Field of Classification Search
CPC .......... H04W 16/18; H04W 72/1289; H04W 72/005; H04W 72/0453; H04W 40/20; H04W 28/26
(Continued)

(56) References Cited

U.S. PATENT DOCUMENTS 7,020,470 B2 * 3/2006 Fattouch ............... H04W 16/18
455/446
2009/0022097 A1 * 1/2009 Yoon ................. H04W 72/1289
370/329
(Continued)

FOREIGN PATENT DOCUMENTS

CN 108476497 A 8/2018
TW 200814631 * 8/2021 ............ H04W 28/26
(Continued)

OTHER PUBLICATIONS

T. T. Thanh Le and S. Moh, "Comprehensive Survey of Radio Resource Allocation Schemes for 5G V2X Communications," in IEEE Access, vol. 9, pp. 123117-123133, Sep. 2021, doi: 10.1109/ACCESS.2021.3109894. (Year: 2021).*

*Primary Examiner* — William D Cumming

(57) ABSTRACT

An apparatus receives an indication of a set of geographic zones and a set of control transmission wireless resource units. For each one of the geographic zones, corresponding control transmission wireless resource unit are specified for use while in that the geographic zone. While in a first zone of the geographic zones, a control transmission is transmitted, reserving a first data transmission wireless resource unit for use by the apparatus for sidelink (SL) data communication. The control transmission is performed using control transmission wireless resource units corresponding to the first zone. The data transmission wireless resource unit is selected from a pool of data transmission wireless resource units and each member of the pool of data transmission wireless resource units is available for use across a set of geographic zones. Different members of the pool of data transmission wireless resource units are concurrently.

20 Claims, 18 Drawing Sheets

(51) Int. Cl.
*H04W 28/26* (2009.01)
*H04W 92/18* (2009.01)

(58) Field of Classification Search
USPC .......................................... 455/466; 370/329
See application file for complete search history.

(56) References Cited

U.S. PATENT DOCUMENTS

2021/0105788 A1* 4/2021 Kim .................... H04W 72/005
2021/0127318 A1* 4/2021 Zhang .................. H04W 40/20
2021/0235219 A1* 7/2021 Zhang .................. H04W 28/26
2021/0385822 A1* 12/2021 Chae ................. H04W 72/0453

FOREIGN PATENT DOCUMENTS

| WO | 2018143416 A1 | 8/2018 | |
| WO | 2019114924 A1 | 6/2019 | |
| WO | WO-2021151386 A1 * | 8/2021 | ............ H04W 28/26 |

* cited by examiner

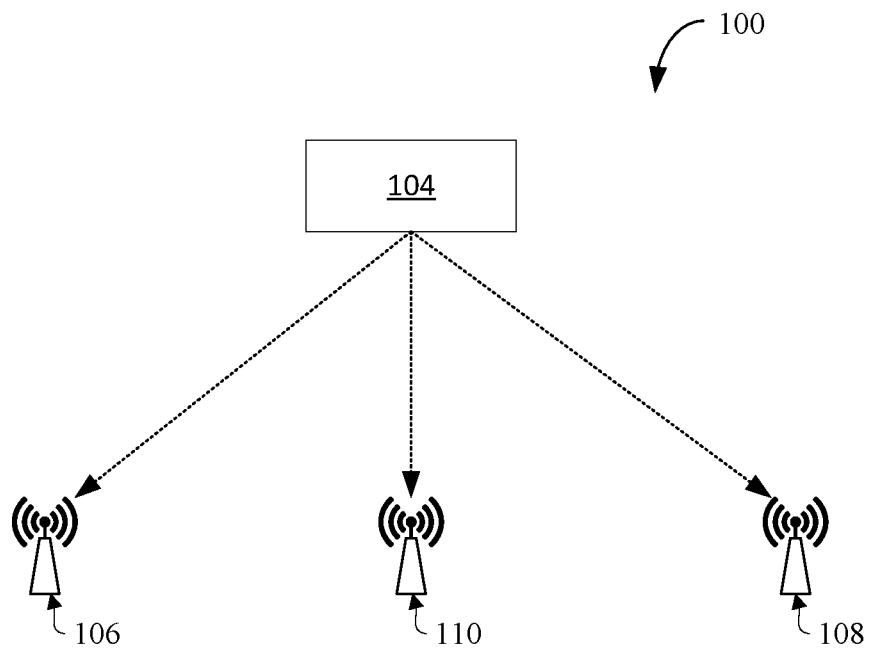
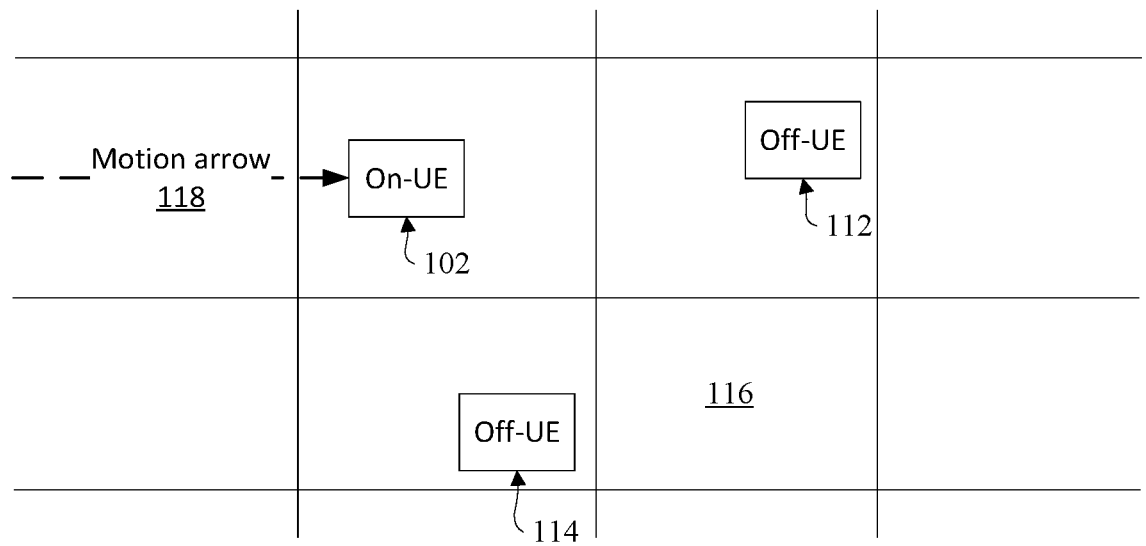
FIG. 1

402

| Zone ID 1 | Zone ID 2 | Zone ID 3 | Zone ID 4 |
|---|---|---|---|
| Zone ID 5 | Zone ID 6 | Zone ID 7 | Zone ID 8 |

400

| 404 | 406 | 408 |
|---|---|---|
| Geographic Zone ID | Description of Geographic Zone | Control Transmission Resources for Use by User Equipment |

| |
|---|
| Geographic Zone ID 502 |
| Data Transmission Resource Used 504 |
| Parameters 506 |
| Service Class 508 |
| Mobility Information 510 |
| Group Size 512 |

| | | | |
|---|---|---|---|
| | Zone ID =6. Used by User equipment 1 | | |

604

| Geographic zone ID = 6 | Data transmission resource ID = 1 | Transmission parameters | Service class ID | Mobility information | Group size |
|---|---|---|---|---|---|
| | Data transmission resource ID = 2 | | | | |

| Geographic Zone ID 702 |
| Transmission Resource Unit Used 704 |
| Tx Parameters 706 |
| Service Class 708 |
| Mobility Information 710 |
| Group Size 712 |

| Zone ID = 1. Used by User equipment 2 | | | Zone ID = 4. Used by User equipment 3 |
|---|---|---|---|
| | Zone ID =6. Used by User equipment 1 | | |

800

| Geographic zone ID = 1 | Data transmission resource ID = 1 | Transmission parameters | Service class ID | Mobility information | Group size |
|---|---|---|---|---|---|
| Geographic zone ID = 1 | Data transmission resource ID = 2 | Transmission parameters | Service class ID | Mobility information | Group size |
| Geographic zone ID = 4 | Data transmission resource ID = 2 | Transmission parameters | Service class ID | Mobility information | Group size |

FIG. 8

SIDE LINK RESOURCE MANAGEMENT

CROSS-REFERENCE TO RELATED APPLICATIONS

This application claims the benefit of priority to U.S. Provisional Patent Application Ser. No. 62/966,926, entitled "Side Link Resource Management Enabling Interruption Free Communication," filed Jan. 28, 2020, the contents of which are hereby incorporated by reference in their entirety.

FIELD OF THE INVENTION

The present invention pertains to the field of wireless communications, and in particular to managing data transmission resources in wireless communication networks that may use sidelink (SL) data transmission.

BACKGROUND

In future wireless networks, data transmissions directly between user equipment (UEs) located in close geographic proximity are expected to become more important. One type of direct transmission between UEs is referred to as sidelink (SL) communication or SL data transmission and is part of the 3GPP standards. Sidelink transmissions are done device-to-device (D2D) (i.e., to UE to UE) in a direct manner and do not require an access node to receive data transmission from a UE and forward the data transmissions to another UE. This distinguishes SL transmission over traditional downlink and uplink data transmission between a UE and an access node.

The use of sidelink transmissions is expected to be particularly advantageous in the implementation of connected car services, self-driving, and autonomous vehicles. These applications are expected to produce better vehicular traffic flow and increased road safety, efficiency, and comfort. In these applications, vehicles may be organized into groups, herein referred to as "platoons," and may use SL transmission to communicate between vehicles in the platoon. A user equipment group consists of at least two UEs where one of the UEs is a transmitter UE (Tx UE) and another UE is a receiving UE (Rx UE). In this case the data transmission from the Tx UE to Rx UE is a unicast transmission. Alternatively, a user equipment group can consist of one Tx UE and multiple Rx UEs. In this case the data transmission from the Tx UE to the multiple Rx UEs is a groupcast or multicast transmission.

However, managing resources for data transmissions (and in particular sidelink data transmissions) with potentially large numbers of UEs in the same communication region is technically challenging. In particular, managing resources for data transmissions in such an environment, in an effective and timely manner, appears to be a challenging problem not yet addressed in the art.

Therefore, there is a need for a method, UE, and system for resource management of resources for data transmissions that is not subject to one or more limitations of the prior art.

BRIEF SUMMARY

An object of embodiments of the present invention is to provide a method, apparatus, system and computer readable medium for managing data transmission resources in communication networks that may use SL data transmission. The use of control transmissions defined herein allows groups of user equipment to utilize, initialize, update, communicate, manage, and select data transmission information to implement SL data transmission between user equipment without requiring communication with base stations, access points, or other network devices or functions.

Embodiments of the present invention facilitate operation of UEs at least in part by allowing UEs to autonomously select which resources they will use for data transmissions. These data transmissions may include but are not necessarily limited to sidelink data transmissions. For example, in some embodiments, the present invention can be used for uplink data transmissions. Because UEs autonomously select resources for data transmissions, latency and complexity which would be required in the case where a resource manager selects resources for data transmissions and communicates the selection to UEs is mitigated. In order to coordinate resource usage among UEs, control transmissions are used to allow a UE to declare to one another and, in some embodiments, to a network manager, what resources the UE has selected for data transmissions. Other UEs and the network manager retain this information and avoid selection of overlapping data transmission resources that would cause data transmissions to interfere with each other. The information can be kept up-to-date via subsequent control transmissions. For clarity, data transmissions are generally transmissions of data made in the data plane or user plane. Control transmissions are generally transmissions of control messages made in the control plane.

Embodiments of the present invention relate in particular to SL data transmissions by apparatus, such as UEs, for example to facilitate communication between vehicles in a coordinated and co-travelling platoon. A UE, for example a leader of a team or platoon of UEs, can select a resource to use for SL data transmissions while in a particular geographic area. The UE may attempt to select the same resource in each successive one of a plurality of geographic areas. Consistently using the same resource while moving is expected to simplify communication or mitigate interruption. This is because the UEs (e.g., the team or platoon of UEs) do not have to switch resources periodically but can continue to use the same resource for data communication.

To facilitate selection of resources for SL data transmission, the UE is configured to perform control transmissions. A region is divided into geographic zones, and each geographic zone is associated with a particular set of control transmission resources. When in a particular geographic zone (e.g., upon entering the zone), the UE uses the control transmission resources for that zone to communicate that the UE (or its team) declares (proposes) to use a specified resource for SL data transmission. The communication is either directly received by other UEs, or received by other UEs via network infrastructure. Upon receipt of this communication, the other UEs may avoid usage of the specified resource while in the zone. Accordingly, the UE reserves usage of the specified resource for the zone. This reservation process can be repeated by the UE for each zone that the UE enters. In some cases, one of the other UEs, for example having a higher priority, may also prefer to use the specified resource. In this case, a contention resolution process is performed to determine which UE is granted usage of the specified resource for the zone.

In accordance with embodiments of the present invention, there is provided a method performed by an apparatus, such as by a UE. The method includes receiving an indication of a set of geographic zones and a set of control transmission wireless resource units. For each one of the geographic zones, a corresponding one or more of the control transmission wireless resource units is specified for use while in that geographic zone. The method includes, while in a first zone of the geographic zones, transmitting a control transmission reserving a first data transmission wireless resource unit for use by the apparatus for sidelink (SL) data communication while in the first zone. The control transmission is performed using one of the control transmission wireless resource units corresponding to the first zone. The first data transmission wireless resource unit is selected from a pool of data transmission wireless resource units. Each member of the pool of data transmission wireless resource units is available for use across a contiguous plurality of the set of geographic zones. Different members of the pool of data transmission wireless resource units are concurrently usable regardless of geographic zone. The method includes using the first data transmission wireless resource unit for SL data communication while in the defined geographic zone. This may be performed following determining that reservation of the first data transmission wireless resource unit in the defined geographic zone is successful.

This method may provide the technical benefit of consistently using the same resource while moving and will simplify communications or mitigate interruption of communications.

In accordance with embodiments of the present invention, there is provided an apparatus, such as a UE, having a processor, a memory and a network interface. The apparatus is configured to receive an indication of a set of geographic zones and a set of control transmission wireless resource units. For each one of the geographic zones, a corresponding one or more of the control transmission wireless resource units is specified for use while in said one of the geographic zones. The apparatus is further configured, while in a first zone of the geographic zones, to transmit a control transmission reserving a first data transmission wireless resource unit for use by the apparatus for sidelink (SL) data communication while in the first zone. The control transmission is performed using one of the control transmission wireless resource units corresponding to the first zone. The first data transmission wireless resource unit is selected from a pool of data transmission wireless resource units. Each member of the pool of data transmission wireless resource units is available for use across a contiguous plurality of the set of geographic zones. Different members of the pool of data transmission wireless resource units are concurrently usable regardless of geographic zone. The apparatus is further configured, for example following determining that reservation of the first data transmission wireless resource unit in the defined geographic zone is successful, to use the first data transmission wireless resource unit for SL data communication while in the defined geographic zone.

This apparatus may provide the technical benefit of consistently using the same resource while moving and will simplify communications or mitigate interruption of communications.

In accordance with embodiments of the present invention, there is provided non-transitory computer readable medium storing instructions executable in a processor of an apparatus, such as a (UE). The apparatus also including a memory and a network interface. The instructions, when executed in the processor cause the apparatus to receive an indication of a set of geographic zones and a set of control transmission wireless resource units. For each one of the geographic zones, a corresponding one or more of the control transmission wireless resource units is specified for use while in said one of the geographic zones. The apparatus is further configured, while in a first zone of the geographic zones, to transmit a control transmission reserving a first data transmission wireless resource unit for use by the apparatus for sidelink (SL) data communication while in the first zone. The control transmission is performed using one of the control transmission wireless resource units corresponding to the first zone. The first data transmission wireless resource unit is selected from a pool of data transmission wireless resource units. Each member of the pool of data transmission wireless resource units is available for use across a contiguous plurality of the set of geographic zones. Different members of the pool of data transmission wireless resource units are concurrently usable regardless of geographic zone. The apparatus is further configured, for example following determining that reservation of the first data transmission wireless resource unit in the defined geographic zone is successful, to use the first data transmission wireless resource unit for SL data communication while in the defined geographic zone.

This computer readable medium may provide the technical benefit of consistently using the same resource while moving and will simplify communications or mitigate interruption of communications.

In further embodiment, a plurality of different pools of data transmission wireless resource units are defined. Where each of the plurality of different pools are assigned for use by any apparatus travelling in a specified direction. The pool is selected from the plurality of pools based on a direction of travel of the apparatus.

This may provide the technical benefit of providing a simple way for apparatus travelling in the same direction to reuse data transmission resources without interfering with each other.

In further embodiment, the first data transmission wireless resource unit is used for SL data communication with one or more other apparatus co-travelling with the apparatus.

This may provide the technical benefit of providing a simple way for apparatus travelling together in a group to reuse data transmission resources without interfering with each other.

In further embodiment, reserving the first data transmission wireless resource unit includes preferentially reserving, as the first data transmission wireless resource unit, a same data transmission wireless resource unit which was also used by the apparatus in one of the geographic zones visited by the apparatus immediately prior to visiting the first geographic zone.

This may provide the technical benefit of allowing an apparatus to reuse the same data transmission resource that it previously used.

Embodiments further include obtaining an indication of a set of data transmission wireless resource units currently prioritized to and in use by other apparatus in the first geographic zone. Furthermore, reserving the first data transmission wireless resource unit includes selecting the first data transmission wireless resource unit as a member of the pool of data transmission wireless resources outside of the set of data transmission wireless resource units currently prioritized to other apparatus in the first geographic zone.

This may provide the technical benefit of allowing for the prioritized allocation of data transmission resources.

In further embodiments, obtaining the indication of the set of data transmission wireless resource units currently prioritized to other apparatus in the first geographic zone includes one or more of receiving one or more transmissions from network infrastructure indicative of the set of data transmission wireless resource units currently in use in the first geographic zone, receiving control transmissions from said other apparatus where said control transmissions reserve members of the set of data transmission wireless resource units in the first geographic zone, and transmitting a discovery message requesting that one or more other apparatus indicate which data transmission wireless resource units are currently in use thereby in the first geographic zone and receiving responses from the one or more other apparatus to the discovery message.

This may provide multiple technical benefits by allowing the communication of the usage of data transmission resources to facilitate allocating those data transmission resources to an apparatus.

Embodiments further include maintaining an indication of usage of data transmission wireless resource units by other apparatus in each of a plurality of the geographic zones and maintaining details of said usage. Wherein said indication of the set of data transmission wireless resource units currently prioritized to other apparatus in the first geographic zone is based at least in part on said indication of usage of data transmission wireless resource units and the details of said usage.

This may provide the technical benefit of enabling an apparatus to track data transmission resources usage within a zone, enabling the more efficient allocation of data transmission resources.

In further embodiments, obtaining the indication of the set of data transmission wireless resource units currently prioritized to other apparatus in the first geographic zone includes; obtaining an indication of a set of data transmission wireless resource units currently in use by other apparatus in the first geographic zone, and obtaining an indication of whether each of said other apparatus has higher priority or lower priority than the apparatus.

This may provide the technical benefit of enabling an apparatus to allocate data transmission resources based on priority of apparatus.

In further embodiments, the other apparatus have higher priority include one or more of; other apparatus with a designated priority level higher than a designated priority level of the apparatus, other apparatus belonging to a team which is larger than a team to which the apparatus belongs, and other apparatus which require use of data transmission wireless resource units for a longer amount of time than the apparatus.

This may provide the technical benefit of determining priority based on level, membership of a team, and the amount of time a data transmission resource is required.

In further embodiments, the apparatus belongs to a plurality of co-travelling apparatus, and determining that reservation of the first data transmission wireless resource unit in the defined geographic zone is successful includes determining that all of the plurality of co-travelling apparatus accept usage of the first data transmission wireless resource unit in the defined geographic zone for use in data transmissions for coordination of the plurality of co-travelling apparatus.

This may provide the technical benefit of coordinating the use of data transmission resources within co-travelling apparatus.

Embodiments further include determining that reservation of the first data transmission wireless resource unit in the defined geographic zone is unsuccessful, and following said determining that reservation of the first data transmission wireless resource unit in the defined geographic zone is unsuccessful, transmitting a second control transmission reserving a second data transmission wireless resource unit for use by the apparatus for sidelink (SL) data communication while in the first zone.

This may provide the technical benefit of being able to obtain data transmission resources when a first request is unsuccessful.

In further embodiment, determining that reservation of the first data transmission wireless resource unit in the defined geographic zone is successful comprises determining that the apparatus, out of a plurality of other apparatus contending for the first data transmission wireless resource unit, is prioritized to use the first data transmission wireless resource unit in the defined geographic zone under predetermined prioritization rules.

This may provide the technical benefit of using a rule based approach to the allocation of data transmission resources.

In further embodiments, said transmitting the control transmission reserving the first data transmission wireless resource unit is performed immediately following said determining that reservation of the first data transmission wireless resource unit in the defined geographic zone is successful.

This may provide the technical benefit of speeding up and improving the efficiency of data transmission resource allocation.

Embodiments have been described above in conjunctions with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

FIG. 1 illustrates a communication network of multiple geographic zones in accordance with one embodiment.

FIG. 4 illustrates control transmission information in accordance with one embodiment.

FIG. 5 illustrates fields of a "Declaration of Usage" control transmission in accordance with one embodiment.

FIG. 6 illustrates an example of a "Declaration of Usage" control transmission in accordance with one embodiment.

FIG. 7 illustrates fields of an "Update of Transmission (Tx) resource" control transmission in accordance with one embodiment.

FIG. 8 illustrates an example of an "Update of Tx resource" control transmission in accordance with one embodiment.

DETAILED DESCRIPTION

Figure 2:
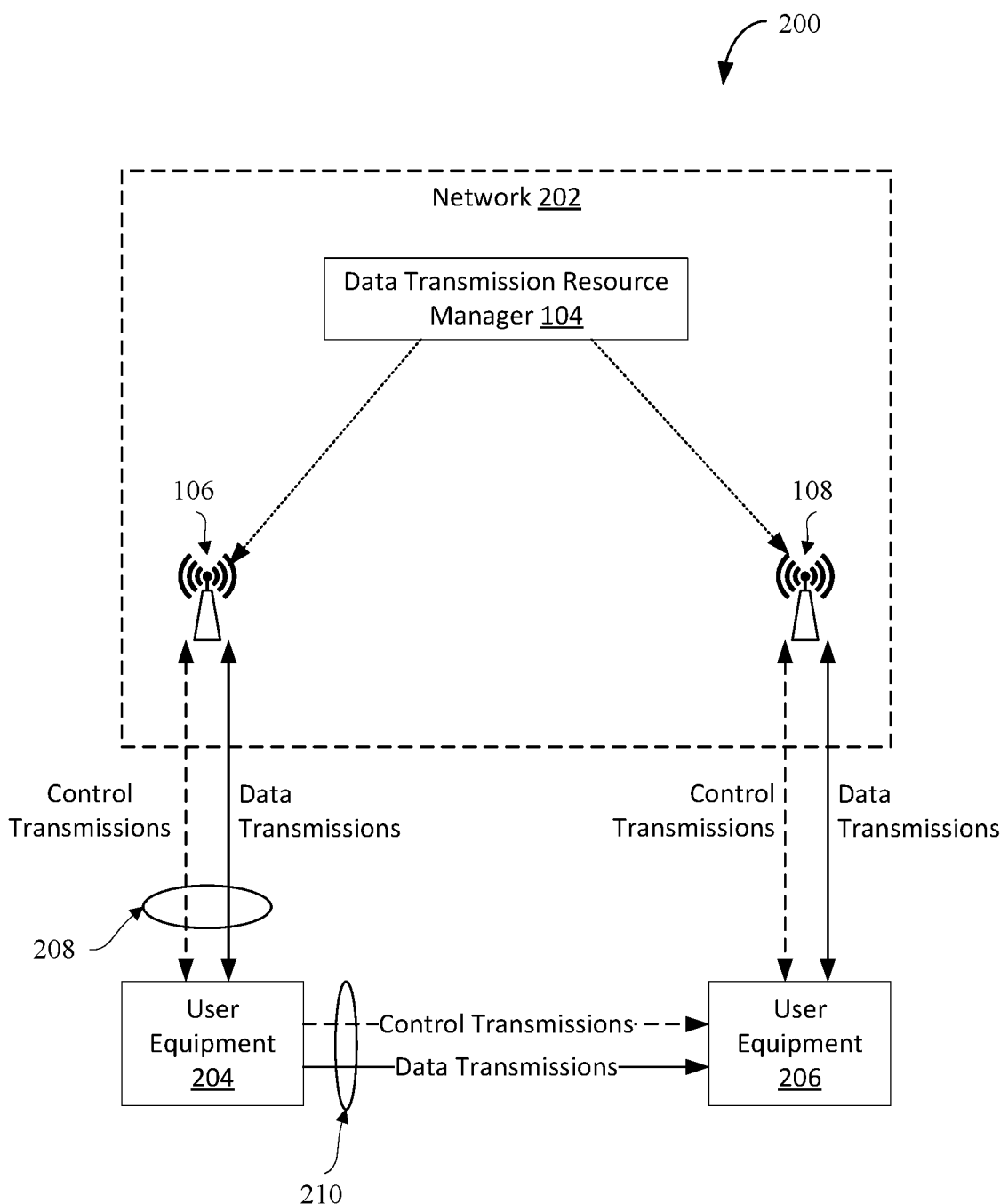
FIG. 2 illustrates a wireless network in accordance with one embodiment.

An object of embodiments of the present invention is to provide a method, UE, system and a computer readable medium for managing data transmission resources for data transmissions in wireless networks. In some embodiments, the use of control transmissions described herein allows a UE to autonomously select data transmission resources for SL data transmissions with another UE without necessarily requiring the UE to communicate with a resource manager.

A wireless device may be mobile or stationary. A wireless device that is mobile and includes the capability for transmitting and receiving over the wireless air interface is generally known as a UE. Examples of a UE include a sensor node, relay node, and a vehicle or vehicle navigation system, and an Internet of Things (IoT) device. A wireless device which is stationary and includes the capability for transmitting and receiving over the wireless air interface is generally referred to as an access node. Examples of an access node includes an infrastructure network node (NN), a base station, a relay node and a roadside unit (RSU). A particular example of a UE is a vehicle or component of a vehicle, which is configured to communicate with other co-travelling vehicles for coordinated navigation, for example in accordance with team navigation or platooning, as would be readily understood by a worker skilled in the art.

Some embodiments use location information of a UE as a basis for control transmission resource management or data transmission resource management. Locations may be absolute or relative and may include 2 dimensions (for example; north-south, and east-west), 3 dimensions (for example; north-south, east-west, and elevation), or other geographic coordinate systems. Location information may include location, velocity, acceleration or similar parameter and may be a measured, predicted, or calculated value. Location information of a user equipment may be obtained from an external or internal source and may be obtained through the use of sensors such as GPS receivers, accelerometers, etc. Location information may also be obtained relative to a known device such as a based station, wireless access point, or beacon. Location can be determined by a UE using a land-based positioning system relying on recognition of signals from terrestrial transmitters at known locations, for example using triangulation or multi-lateration, monitoring of signal strengths or flight times of signals received from known locations, etc. Various location determination techniques can be used as would be readily understood by a worker skilled in the art.

Embodiments may utilize a geographic zone centric design. An area with wireless network coverage is divided into one or more geographic zones of arbitrary size and shape. It is not required that geographic zones be centered on base stations, access points, or other cellular network infrastructure. Instead, the number, size, and shape of geographic zones may be based on a number of criteria including number of devices, amount of traffic, characteristics of traffic, size and shape of a structure, etc. Geographic zones may be fixed in location, size and shape, until updated or modified. Geographic zones may also be dynamic and may be changed dynamically based on any number of parameters such as devices using the zone, traffic, burstiness, QoS requirements, etc. A special case of a geographic zone would be arbitrarily large in size, or cover the entire area with wireless network coverage, and all user equipment would utilize the resources of the single geographic zone. A UE may process its location to determine the geographic zone it is in, for example based on predetermined or received zoning information for example in the form of a map. Areas without wireless network coverage may also be divided into geographic zones. UEs in such geographic zones may communicate with each other directly to implement embodiments of the present invention.

Embodiments utilize transmission resource information which may be "control transmission information" or "data transmission information." Control transmission information comprises transmission resources that may be used by user equipment for control transmissions (which may also be referred to as control plane transmissions.) Data transmission information comprises transmission resources that may be used by user equipment for data transmissions (which may also be referred to as data plane transmissions or user plane transmissions.) Transmission resources are also referred to herein as transmission wireless resource units. Data transmission resources can be referred to as data transmission wireless resource units, and control transmission resources can be referred to as control transmission wireless resource units. Different transmission wireless resource units may be orthogonal, in the sense that they can be used substantially concurrently with limited to no interference even in the same geographic zone. Orthogonal resources can be defined based on various multi-access schemes, such as frequency division, time division and code division schemes, or the like, as would be readily understood by a worker skilled in the art.

Data transmission information may be stored in a table, list, data structure, or look up table. Data transmission resources may vary depending on a geographic zone that the user equipment is located in. For a UE to transmit data, the UE typically must first select at least one data transmission resource. The structure containing data transmission information can be referred to as a Tx-RU-on-use table.

Similarly, control transmission information may use a similar collection of information and have different control transmission resources depending on the location of the user equipment. For a UE to transmit a control message, the UE typically must first select at least one control transmission resource.

In embodiments, data transmission information is initialized, communicated, transmitted, updated, and otherwise conveyed using control transmissions. These control transmissions may take the form of control plane messages. Three types of control transmissions (also referred to as control messages) are "Declaration of Usage" transmissions, "Update of Tx resource" transmissions, and "Discovery of Tx Resource Usage" transmissions.

A Declaration of Usage transmission indicates one or more data transmission resources selected by a UE for data transmission.

An Update of Tx resource transmission indicates which data transmission resources are available for data transmission from one UE to another UE, or between a user equipment and a data transmission information manager. The indication can be an indirect indication. For example, the Update of Tx resource transmission can indicate which data transmission resources are currently occupied (in use by other UEs) and thus unavailable for use by other UEs. The UE can then infer which data transmission resources are available.

A Discovery of Tx Resource Usage transmission is used to request an Update of Tx resource transmission from another UE, or a data transmission information manager.

The above three types of control transmissions allow a user equipment to obtain and indicate data transmission information. Based on this, the UE may select a transmission resource for (or uplink) data transmission.

Embodiments may include control transmission information that allows a user equipment to select control transmission resources with which to transmit the above control transmissions. An indication of the location of geographic zones, e.g., in the form of a map, may be provided to UEs. Along with this indication, an indication of control transmission resources to be used in each geographic zone may be provided to the UEs. This information may be stored in a data structure which may be referred to as an S-MAP. The S-MAP includes identifiers of zones, descriptions of the physical zone boundaries, and an indication of the control transmission resources allocated to each of the zones.

FIG. 1 illustrates a communication network with multiple geographic zones 100. The communication network includes a user equipment 102 that is in an area of coverage of the network that includes a number of geographic zones 116. In this case, UE 102 is in motion as indicated by the motion arrow 118. Also present in adjacent geographic zones 116 are user equipment 112 and user equipment 114, or groups of such UEs. When user equipment 102 makes a data transmission or a control transmission it should use an appropriate transmission resource so as not to interfere with user equipment 112 and user equipment 114. Also present are base stations or access points labelled 106, 108, and 110. A resource manager that manages the resources used for data transmissions (hereinafter referred to as data transmission resource manager 104) exists in the radio access network (RAN) or core network (CN) that may help to manage the data transmission information or the control transmission information. In more detail, when user equipment 102 makes a control transmission, it checks S-MAP information to determine which appropriate control transmission resource should be used based on its current location. When user equipment 102 makes a data transmission, it determines an appropriate data transmission resource based on current data transmission information, for example as stored in a Tx-RU-on-Use table.

The resource manager can be configured to define the S-MAP or other control transmission information, for example indicating control transmission resources to use in one or more geographic zones. The resource manager can be configured to define the pool or pools of data transmission resources, which may be usable across a plurality of geographic zones and which are not necessarily tied to any geographic zones. The resource manager can be configured to define contention resolution rules, for example based on QoS criteria. The contention resolution rules are used to determine which UE is allowed to use a particular data transmission resource when two or more UEs attempt to reserve or use that data transmission resource. The resource manager may be configured to manage communication of the above information to UEs, for example via other network infrastructure.

Base stations, access points and data transmission resource managers can also be referred to as network infrastructure. The UE 102 may be part of a co-travelling group of UEs, such as a platoon of vehicles in communication with one another. In such a case, the entire box 102 may be interpreted as a group of UEs for example with a leader UE which performs resource reservation operations as described herein. In other embodiments, the resource manager is omitted and the UEs coordinate with each other directly. Each grid square represents a geographic zone, such as geographic zone 116.

FIG. 2 illustrates a wireless network 200 according to an embodiment of the present invention. The architecture comprises a data transmission resource manager 104, which may be a network function to store, update, distribute, and manage data transmission information or control transmission information. A UE such as UE 204 and UE 206 may communicate directly with each other using UE-to-UE interface 210. The communications between UE 204 and UE 206 may include data transmissions and control transmissions. The UE-to-UE interface 210 is generally referred to as a sidelink. UE 204 may also communicate with access node 106 using UE-to-network interface 208. The communications between the UE 204 and access node 106 may include data transmissions and control transmissions. Although UE 204 is shown communicating with access node 106 and UE 206 is shown communicating with access node 108, both UEs may additionally or alternatively communicate with the same access node. Furthermore, one or both of the UEs 204, 206 may not necessarily communicate with an access node or other network infrastructure.

As discussed above, the data transmission resource manager 104 may be provided using a network function. Network functions are instantiated upon the underlying resources of a network node such as in a data center. Network functions utilize hardware and software resources from the pool of resources upon which they are instantiated. Network functions act as independent entities. From a logical perspective, network functions may be considered indistinguishable from a physical node carrying out the same function. It should also be understood that in a sliced network where data centers provide the underlying resources upon which the slices are created, it is possible for a single network to have network slices that support different versions of networks, so for example, in addition to having a virtualized network to support 5G traffic, a separate network slice can be created to support 4G networks. Traffic from a user equipment can be routed through a network function, to a gateway that provides access to a packet data network such as the Internet. Radio access services are typically provided by an access node in the radio access node (RAN). Where a conventional RAN architecture was designed to be composed of discrete elements, such as eNodeBs, that were connected to the Core Network through a backhaul network, a C-RAN takes advantage of function virtualization to virtualize the Access Nodes of the network. Much as a physical Access Node, such as an eNodeB, was connected to an antenna by a front haul link, in an embodiment of a C-RAN Access Nodes, such as a gNodeB, are connected to antenna (or to a remote radio head (RRH)) through a front haul connection, but are network functions that are instantiated upon compute resources of the network. If a gNodeB is divided into a Central Unit and a plurality of Distributed Units, the virtualized Distributed Units may in some embodiments be instantiated at or near the location of the antenna, while a Centralized Unit may be instantiated at a data center to connect and serve a plurality of geographically dispersed distributed units. A UE may be connected to the network through an access node, which can provide radio access services through an antenna. The access node may be instantiated upon the compute and storage resources provided by a data center. Other access nodes may be connected to the same set of antennae or remote radio head (RRH), and also be instantiated upon the resources of the data center. It should be understood that the fronthaul connections linking the virtualized access nodes to the antennas or RRHs, may be direct connections, or they may form a fronthaul network. The integration of a centralized RAN (C-RAN) into a core network may obviate or reduce the concerns associated with backhaul connections as the access node functions may be co-located with core network functions. A network function may be instantiated at more than one data center and be part of a function migration process in which the network function is moved through the network, or one of the instantiations may be an intentionally redundant instantiation. Both network functions can be instantiated and configured, with only one of them active at a time, or they may both be active, but only one of them may be transmitting data to a UE.

The virtualization of a network functions allows a network function to be located in the network at a location topologically close to the demand for the service provided by the network function. Thus, an access node associated with an antenna can be instantiated upon data center resources at the data center closest to the antenna. Network functions such as a data transmission resource manager 104, may be instantiated further away (in either or both of a topological or physical sense) from another network function.

In some embodiments, the data transmission resource manager 104 manages data transmission information. UE-to-UE interface 210 is responsible for distribution and updating of data transmission information. The data transmission resource manager 104 interfaces with UEs using control transmissions.

In some embodiments, UE 204 is associated with a first team or group of UEs, and UE 206 is associated with a second, different team or group of UEs. For example, UE 204 may be associated with a vehicle of a first platoon, and UE 206 may be associated with a vehicle of a second platoon. In such embodiments, there are not necessarily any data transmissions between the UEs and the access nodes, or between the two UEs. Instead, the focus is on control transmissions. In particular, UE 204 may perform a control transmission which indicates that it declares (proposes) to use a specified data transmission resource (e.g., for SL communications) in a specified geographic zone. This may take the form of a Declaration of Usage transmission.

The UE 206, upon receipt of the control transmission, may store an indication that the specified data transmission resource is reserved for use by the UE 204. Thereafter the UE 206 may avoid attempting to use this data transmission resource, for example in cases where potential mutual interference can be predicted. In some cases, if the UE 206 is attempting to use the same data transmission resource, and the UE 206 determines that it has a higher priority than the UE 204 with respect to data transmission resource usage, the UE 206 may perform its own control transmission that indicates that it declares to use the data transmission resource in the geographic zone. The UE 204, upon receiving this control transmission, may avoid using the data transmission resource and may instead select another resource for use.

In some embodiments, the UE 206 monitors for and receives the control transmission directly as a SL control transmission. In some embodiments, the network, e.g., the access node 106 or 108, monitors for and receives the control transmission, and performs a further control transmission indicative of content of the control transmission for receipt by the UE 206. Accordingly, content of the control transmission is relayed via the network from the UE 204 to the UE 206, for example via broadcast messaging performed by one or more access nodes. The further control transmission made by the network may be referred to as an Update of Tx resource transmission.

In some embodiments, UE 204 and UE 206 belong to the same group of co-travelling UEs, such as the same vehicle platoon. In this case data transmission occurs, for example routinely, between the UEs. It can be desirable to use the same data transmission resources for such communication in multiple zones, in order to mitigate the requirement for switching between resources which can result in communication interruption. This facilitates interruption free communication. Embodiments of the present invention are employed to facilitate this. For example, a UE can attempt to reserve the same data transmission wireless resource unit in each geographic zone. That is, upon entering a geographic zone, a UE may preferentially reserve a data transmission wireless resource which was also used by the UE in another geographic zone visited by the UE immediately prior to visiting the geographic zone.

When the UE 204 and the UE 206 belong to the same group of co-travelling UEs, some control communication can occur between the UEs. For example, the UE 204 can transmit a declaration or reservation message which indicates that the UE proposes to use a particular data transmission resource within a zone. The UE 206 can receive this message and use it to configure its communications, for example by switching to use the particular data transmission resource if necessary. Furthermore, if the UE 206 determines that the particular data transmission resource is not preferred (e.g., due to interference detected by the UE 206 but not the UE 204), the UE 206 can indicate, via control communication, that a different data transmission resource should be used. The same control transmission can thus serve multiple purposes—to inhibit UEs from other groups from using the same data transmission resource, and to indicate to UEs of the same group which data transmission resource is to be used.

Figure 3:
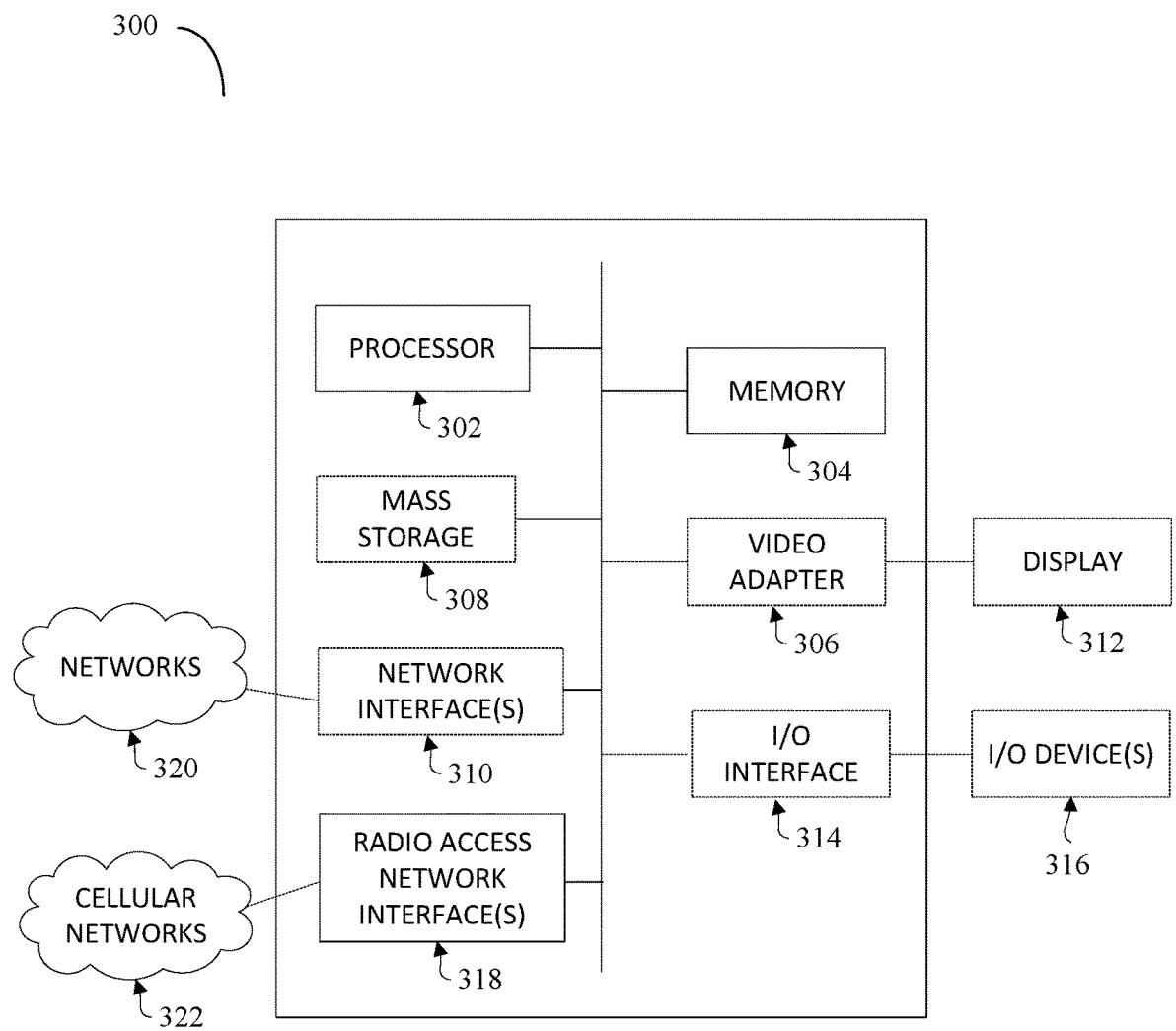
FIG. 3 illustrates a wireless device in accordance with one embodiment.

FIG. 3 is a block diagram representative of a wireless device 300, which may be a UE or an access node. Examples of an access node for example a NodeB, an enhanced Node B (eNodeB), a next generation NodeB (sometimes referred to as a gNodeB or gNB), a home subscriber server (HSS), a gateway (GW) such as a packet gateway (PGW) or a serving gateway (SGW) or various other nodes or functions within an evolved packet core (EPC) network. When wireless device 300 is a UE, it connects to network infrastructure over a radio interface. In some embodiments, a UE may be a Machine Type Communications (MTC) device (also referred to as a machine-to-machine (m2m) device), or another such wireless device that may be categorized as a UE despite not providing a direct service to a user. In some references, UE may also be referred to as a mobile wireless device, a term intended to reflect devices that connect to mobile network, regardless of whether the device itself is designed for, or capable of, mobility. Specific wireless devices may utilize all of the components shown or only a subset of the components, and levels of integration may vary from device to device. Furthermore, a wireless device may contain multiple instances of a component, such as multiple processors, memories, transmitters, receivers, etc. In various embodiments, a UE may be a vehicle or incorporated into a vehicle, such as a self-driving vehicle which coordinates with other vehicles.

The wireless device 300 typically includes a processor 302, such as a Central Processing Unit (CPU), and may further include specialized processors such as a Graphics Processing Unit (GPU) or other such processor, a memory 304, a network interface(s) 310 and a bus to connect the components of wireless device 300. The wireless device 300 may optionally also include components such as a mass storage 308, a video adapter 306, and an I/O interface 314 (shown in dashed lines), for example when the wireless device 300 is a UE. The network interface 310 can be used for UE-to-UE communication, UE-to-infrastructure communication, or both.

The memory 304 may comprise any type of non-transitory system memory, readable by the processor 302, such as static random access memory (SRAM), dynamic random access memory (DRAM), synchronous DRAM (SDRAM), read-only memory (ROM), or a combination thereof. In an embodiment, the memory 304 may include more than one type of memory, such as ROM for use at boot-up, and DRAM for program and data storage for use while executing programs. The bus may be one or more of any type of several bus architectures including a memory bus or memory controller, a peripheral bus, or a video bus.

The wireless device 300 may also include one or more network interface(s) 310, which may include at least one of a wired network interface and a wireless network interface. As illustrated in FIG. 2, network interface(s) 310 may include a wired network interface to connect to a network(s) 320, and also may include a radio access network interface(s) 318 for connecting to other wireless devices over a radio link. When wireless device 300 is an access node, such as a RAN node, both wired and wireless network interfaces may be included. Radio access network interface(s) 318 may be present and it may be supplemented by other wireless interfaces such as WiFi network interfaces. The network interface(s) 310 and radio access network interface(s) 318 allow the wireless device 300 to communicate with remote entities such as those connected to wireless network(s) 320 and cellular networks 322.

The mass storage 308 may comprise any type of non-transitory storage device configured to store data, programs, and other information and to make the data, programs, and other information accessible via the bus. The mass storage 308 may comprise, for example, one or more of a solid state drive, hard disk drive, a magnetic disk drive, or an optical disk drive. In some embodiments, mass storage 308 may be remote to the wireless device 300 and accessible through use of an interface such as network interface(s) 310. In the illustrated embodiment, mass storage 308 is distinct from memory 304 where it is included and may generally perform storage tasks compatible with higher latency but may generally provide lesser or no volatility. In some embodiments, mass storage 308 may be integrated with a heterogeneous memory.

The optional video adapter 306 and the I/O interface 314 (shown in dashed lines) provide interfaces to couple the device 300 to I/O device(s) 316. Examples of I/O device(s) 316 include a display 312 coupled to the video adapter 306 and an I/O device(s) 316 such as a touch-screen coupled to the I/O interface 314. Other devices may be coupled to the wireless device 300, and additional or fewer interfaces may be utilized. For example, a serial interface such as Universal Serial Bus (USB) (not shown) may be used to provide an interface for an external device.

In various embodiments, information indicative of control transmission resources that are available for control transmissions (i.e., control transmission information 400, with reference to FIG. 4) is stored in a resource manager that manages the resources used for control transmissions (not shown). The control transmission information can be accessed by or otherwise provided to a UE. The control transmission information 400 may be stored in computer memory 304 or mass storage 308 of a UE. The resource manager may be a network function instantiated in the CN or in an access node. In some embodiments, instead of storing the control transmission information 400 in the resource manager that manages the resources used for control transmissions, the control transmission information 400 may be stored in the data transmission resource manager 104 which may be configured to manage both resources used for control transmissions and resources used for data transmissions. The control transmission information 400 may be in the form of a table, a list, a linked list, database record, etc. that allows for the organization, management, and storage of the control transmission information 400 (with reference to FIG. 4). The control transmission information 400 may be transmitted to UEs as data that may be compressed or encrypted.

Accordingly, UEs may receive an indication of a set of geographic zones and a corresponding set of control transmission resources (e.g., the S-MAP information). Each geographic zone specifies one or more control transmission resources for use while in that geographic zone. The control transmission resources may be re-used in different, non-adjacent zones. When in a particular geographic zone, a UE is configured to use the corresponding control transmission resources, for example for transmitting reservation or declaration messages pertaining to data transmission resources. Different control transmission wireless resource units can be orthogonal. Multiple UEs can share the control transmission wireless resource units, for example according to a contention-based operation mechanism. Control transmission resources may also be referred to as signaling resources.

In embodiments, control transmission information 400 includes information that indicates which control transmission resources are available for each geographic zone in a group of geographic zones 402. In other words, the control transmission information 400 indicates which control transmission resources 408 are available to a UE in that geographic zone. One example of control transmission information 400, is shown in FIG. 4. The control transmission information 400 illustrated covers a group of eight geographic zones. Though each geographic zone is shown as square, they may be of arbitrary size and shape as described above. Optimal geographic zone size and shape can be obtained through any number of ways, such as, simulation, measurement, or a reporting mechanism.

For each geographic zone, the control transmission information 400 may include various information, including a geographic identifier 404 (referred to hereinafter as geographic ID 404), information 406 that includes a description of the geographic zone, and information 408 that indicates which control transmission resources are available. The geographic ID 404 is used as a unique identifier for the geographic zone. The information 406 includes a description of the geographic zone and can take a variety of forms used to describe a physical area. The information 408 indicates which control resources are available for use by a UE for control transmissions. The information 408 may be updated based on information included in control transmissions (i.e., control messages) received from the resource manager based on control transmission resources presently being used by any other UE in a geographic zone.

In embodiments, control transmission information 408 takes the form of or at least can be represented using a table that includes one column that has a geographic zone identifier (geographic zone ID 404), a second column that includes the information 408 indicative of the description of the geographic zone, and a third column that includes the information 408 indicative of control transmission resources that are available for control transmissions by a UE. Each row in the table is an association between a geographic zone ID and control transmission resources that are available in the geographic zone identified by the geographic zone ID 404.

The control transmission information 400 may be managed by the resource manager that manages the resources used for control transmissions (not shown) and delivered to any UE that registers to use the control transmission information 400. The control transmission information 400 may be stored by any UE. Delivery of control transmission information 400 may be performed using any suitable method. In the case of a platoon of vehicles using SL communication, a UE such as a leader of the platoon, can register to be able to distribute and update the control transmission information 400 by sending a registration request to the resource manager that manages the resources used for control transmissions (not shown).

The control transmission information 400 allows a UE to autonomously select control transmission resources for a control transmission without having to communicate with an access node or the resource manager (not shown). The capability in the UE to autonomously select control resources for a control transmission enables a reduction in communication overhead with an access node and the resource manager. A UE that has a pending a control transmission first determines the geographic zone in which it is located and then accesses the control transmission information 400 to obtain the information 408 indicative of the available control transmission resources. The UE then selects control transmission resource from the available control transmission resources 408 and uses the selected control transmission resource to transmit the control transmission. As described in further detail below, the control transmission includes an indication of one or more data transmission resources that were selected by the UE for data transmissions based on data transmission information stored at the UE. The control transmission resource may be selected by a variety of methods such as random selection, or another arbitrary or rule-based selection method. If a collision is detected during the control transmission, other protocols as known in the art may be used to retransmit the control transmission to avoid a subsequent collision.

Embodiments comprise a global resource pool of resources for data transmissions (referred to herein as data transmission resources or data transmission wireless resource units, also referred to as Tx-RUs) that may be used for data transmissions, and in particular SL data transmission between UEs. The data transmission resources included in the global resource pool can be valid over a geographic zone that covers a large area that may include a number of geographic zones as shown in FIG. 4. The data transmission information may be managed by a data transmission resource manager 104. A UE may register with the data transmission information manager 104 and receive the data transmission information which is indicative of the data transmission resources that are available within the global resource pool. The UE may register with the data transmission resource manager 104 after initially establishing connection with an access node in the RAN using Radio Resource Control (RRC) signaling procedure and performing authorization with the Core Network using Non-Access Stratum (NAS) signaling procedure. The data transmission information may be provided to the registered UE using a control transmission as described herein. The use of data transmission information by a UE is described in the following embodiments. In some embodiments, a UE may receive the data transmission information from data transmission resource manager 104 via an access node using an air interface between the access node and the UE.

Accordingly, each data transmission wireless resource unit may be available for use across a contiguous plurality of a set of smaller geographic zones. A UE may select a data transmission wireless resource to reserve from a pool of data transmission wireless resource units, for use in a given geographic zone. This selection may be repeated for each geographic zone, with the UE preferring to re-use the same resource in each successive zone. A single pool may be used, or multiple, separate pools may be used. Following determining that reservation of a data transmission wireless resource unit in a given geographic zone is successful, the UE may use the reserved data transmission wireless resource unit while in the defined geographic zone, for example for SL data communication. Determining that reservation is successful may include selecting a resource which is known to be currently unused, for example based on the Tx-RU-on-Use table or other equivalent data structure. Determining that reservation is successful may include a contention resolution process or prioritization procedure, or obtaining confirmation from other UEs (e.g., within a group or platoon) that the selected resource is acceptable for use.

Embodiments include a Declaration of Usage transmission that includes data transmission resources that were selected by the UE. The Declaration of Usage transmission is used by a UE to declare or announce to other UEs or the data transmission resource manager 104 that it is using a selected data transmission resource for data transmissions, and in particular SL data transmissions. Any other UE may monitor for the transmission of Declaration of Usage transmissions and use the information include a Declaration of Usage transmission to update the data transmission resource information stored therein and to select an unused data transmission resource from the data transmission information to perform their own data transmissions, and in particular SL data transmissions. Updating the data transmission resource information may involve updating a Tx-RU-on-Use table held by the UE.

The Declaration of Usage transmission is a control transmission reserving a particular data transmission wireless resource unit (indicated in the transmission) for use by the UE while in a particular (e.g., current) geographic zone. In various embodiments, the Declaration of Usage transmission is transmitted by the UE while in the geographic zone, for example upon entering the geographic zone. That is, the Declaration of Usage transmission can be performed on an as-needed basis. Alternatively, when a UE utilizes network infrastructure to communicate with other UEs, the Declaration of Usage transmission may be transmitted prior to entering a geographic zone.

FIG. 5 illustrates a Declaration of Usage transmission 500. The Declaration of Usage transmission 500 may be a control message that includes entries including:

Geographic zone ID 502 and information indicative of data transmission resources used 504 by the UE (i.e., selected by the UE), and For each data transmission resources used 504;
an indication of the duration of time the data transmission resource is expected to be used for,
an indication of physical layer parameters 506, such as transmission power level ID, etc.,
an indication of a service class 508 and the priority indicator corresponding to the service class 508 that the transmission is associated with,
an indication of mobility information 510, such as moving speed, moving direction, etc. of the UE,
an indication of group size 512, for example the number of UE(s) in a group, the geographic communication radius, maximum transmission range or geographic zone ID of any UE receiving the transmission.

Other information may also be included as dictated by a particular embodiment. Indications such as duration of time, service class and group size can be used for example for prioritization or contention resolution purposes, as will be described elsewhere herein.

FIG. 6 illustrates an example of Declaration of Usage transmission 600 for a UE located in a geographic zone in the group of geographic zones 602. In this example, the UE is located in geographic zone with a geographic zone ID 502 of 6 and has a pending data transmission (e.g., a pending SL data transmission). The UE has a local copy of the data transmission information which indicates which data transmission resources are available for the pending data transmission. This information may be stored in the form of a Tx-RU-on-Use table. The UE selects data transmission resources with IDs 1 and 2 as shown in FIG. 6. The UE then transmits a Declaration of Usage transmission to the data transmission resource manager 104 or to other nearby UEs that may be monitoring Declaration of Usage transmissions. The Declaration of Usage transmission is a control transmission so the UE must first select a control transmission resource from the control transmission information stored at the UE as described above. The UE then sends the Declaration of Usage transmission using the selected control transmission resources. The Declaration of Usage transmission includes an indication of the data transmission resources that were selected by the UE for data transmissions. The Declaration of Usage transmission may include entries of each data transmission resource used with the entry for each data transmission resource including the geographic zone ID 502, the Data transmission resources used 504, parameters 506, service class 508, mobility information 510, and group size 512 as described above.

When the data transmission resource manager 104 or another UE receives the Declaration of Usage transmission that includes the indication of the data transmission resource is in use by a UE, the data transmission resource manager 104, or another UE updates its data transmission information to indicate that the data transmission resources being used by the UE are no longer available for use.

In some embodiments, when prioritization is used, the data transmission information can indicate that a data transmission resource in use by a UE is not available for use in an associated geographic zone, except by another UE having higher priority. In such cases, the UE should be notified (e.g., via another Declaration of Usage transmission or via an Update of Tx resource transmission) before the UE having higher priority begins using the data transmission resource.

In some embodiments, a UE may send another Declaration of Usage transmission to indicate that a data transmission resource previously selected by a UE is released and is no longer in use. The data transmission resource which was previously selected by a UE is now available to be selected and used by another UE for data transmissions (e.g., sidelink data transmissions).

FIG. 7 illustrates a record in an Update of Tx resource transmission 700 as used by a UE in some embodiments. The Update of Tx resource transmission is a control transmission that is used to transmit data transmission information to UEs. The Update of Tx resource transmission 700 may be sent by the data transmission resource manager 104 to another UE to enable the other UE to update its local copy of the data transmission information (e.g., in the form of a Tx-RU-on-Use table). The Update of Tx resource transmission may contain a complete copy of the data transmission information, partial data transmission information, or just data that has changed since the transmission of the last Update of Tx resource transmission, or some other portion of the data transmission information. In various embodiments, network infrastructure may aggregate information from Declaration of Usage transmissions received from multiple UEs, and transmit the aggregated information in an Update of Tx resource transmission.

The Update of Tx resource transmission may include a record 700 for each geographic zone in which a UE is using a data transmission resource. The Update of Tx resource transmission typically includes multiple records 700. Each record may include the following:

A geographic zone ID 702,
an indicator 704 of the data transmission resource being used and optionally an indication of the duration of time of data transmission resource is expected to be used for,
an indication of physical layer Tx parameters 706, such as transmission power level ID, and etc.,
an indication of service class 708 and the priority indicator corresponding to the service class 708 ID that the transmission is associated with,
an indication of mobility information 710, such as, moving speed, moving direction, etc.,
an indication of group size 712, for example the number of user equipment(s) in the group, or the geographic communication radius, maximum transmission range, or geographic zone IDs of any user equipment presently receiving a transmission, etc.

FIG. 8 illustrates an example of an Update of Tx resource transmission 800. In this example, user equipment 2 is transmitting in geographic zone 1, user equipment 3 is transmitting in geographic zone 4, and user equipment 1 is transmitting in geographic zone 6. An Update of Tx resource transmission is sent by the data transmission resource manager 104 and may be received by any of the UE in the group of geographic zones 802. Each record of the Update of Tx resource transmission message includes geographic zone ID 702, indicator 704, Tx parameters 706, service class 708, mobility information 710, and group size 712, as described above.

Embodiments may also include a Discovery of Tx Resource Usage transmission that may be transmitted by a UE to obtain the latest data transmission information from the data transmission resource manager 104 or another UE. The Discovery of Tx Resource Usage transmission may include the ID of the geographic zone that the UE is currently located in, and information indicative of the geographic zones for which the UE is intending to subsequently communicate In some embodiments, a UE in receipt of a Discovery of Tx Resource Usage transmission may respond by transmitting a Declaration of Usage transmission, when that UE is using or is attempting to reserve data transmission resources. Additionally, or alternatively, a network infrastructure device in receipt of a Discovery of Tx Resource Usage transmission may respond by transmitting an Update of Tx resource transmission indicative of current Tx resource usage in the geographic zone of interest. The update may indicate contents of a Tx-RU-on-Use table held by the network infrastructure device. This allows the UE in receipt of the Update of Tx resource transmission to reproduce the Tx-RU-on-Use table locally.

In an initial state, all geographic zones included in the data transmission information of the UE are set to be empty. In embodiments, the data transmission information must be initialized in a UE prior to the UE being able to select a data transmission resource for data transmissions (e.g., SL data transmissions). In some embodiments, the data transmission information or the control transmission information, or both, may be pre-configured into the UE, for example at time of manufacture, sale or deployment. In some embodiments, the data transmission or the control transmission information, or both, may be delivery to the UE via on over-the-air configuration operation, for example delivered to the UE using an air interface between an access node and the UE upon network registration of the UE, or upon user request or another operation. Other embodiments include procedures for initializing the data transmission information in a UE using periodic transmission of data transmission information 900, by using on-demand transmission to request data transmission information 1000, or other suitable method.

Figure 9:
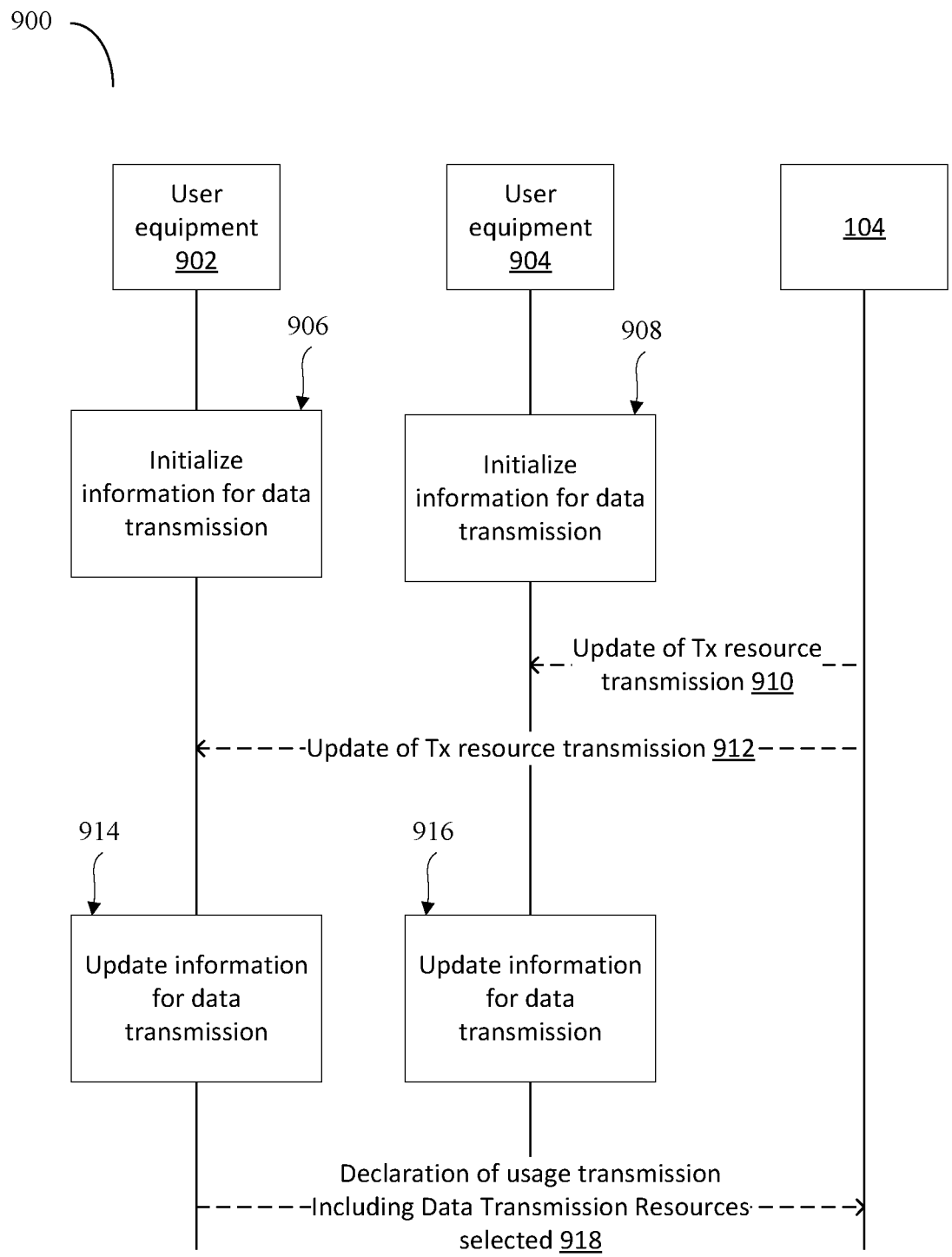
FIG. 9 illustrates the periodic transmission of data transmission information in accordance with one embodiment.

FIG. 9 illustrates a procedure 900 for initializing and updating data transmission information using periodic control transmissions. A first UE 902, starting with uninitialized data transmission information, initializes 906 its data transmission information. Initialization may involve, for example, allocating memory for storing data transmission information, generating an empty table for storing the data transmission information, triggering a process to obtain an up-to-date copy of the data transmission information from the data transmission resource manager 104 as described above, or a combination thereof. Initialization in FIGS. 9 and 10 may be omitted if not necessary. A second UE 904, also starting with uninitialized data transmission information, initializes 908 its data transmission information in as similar manner as the first UE 902. It is noted that an explicit request for data transmission information (e.g., via a Discovery of Tx Resource Usage transmission) is absent from FIG. 9, but such a request is shown for example in FIG. 10.

A data transmission resource manager 104 is configured to use a periodic control transmission that includes the data transmission information to provide the first UE 902, the second UE 904, and any other UE with up-to-date copies of the data transmission information. The data transmission resource manager 104 transmits an Update of Tx resource transmission 910 that is received by the first UE 902 and another Update of Tx resource transmission 912 that is received by user equipment 904. Having received updated data transmission information, first UE 902 updates 914 its data transmission information and the second UE 904 will also update 916 its information for data transmission information. In some cases, the two control transmissions 910, 912 by the data transmission information manager 104 may be combined and sent as a multi-cast or broadcast message. In some cases, the control transmissions 910, 912 include only data transmission information that has changed since the last such control transmission received by a UE. In other cases, the control transmissions 910, 912 may include a full description of data transmission information or updated data transmission information that is already known to a UE, and the receiving UE is responsible for selectively updating its local data transmission information. Later, when either the first UE 902 or the second UE 904 selects a data transmission resource from its data transmission information to transmit data, it transmits a Declaration of Usage transmission 918 to the data transmission information manager 104 to provide the data transmission information manager 104 with up-to-date data transmission information (i.e., up-to-date information regarding the usage of data transmission resources).

Figure 10:
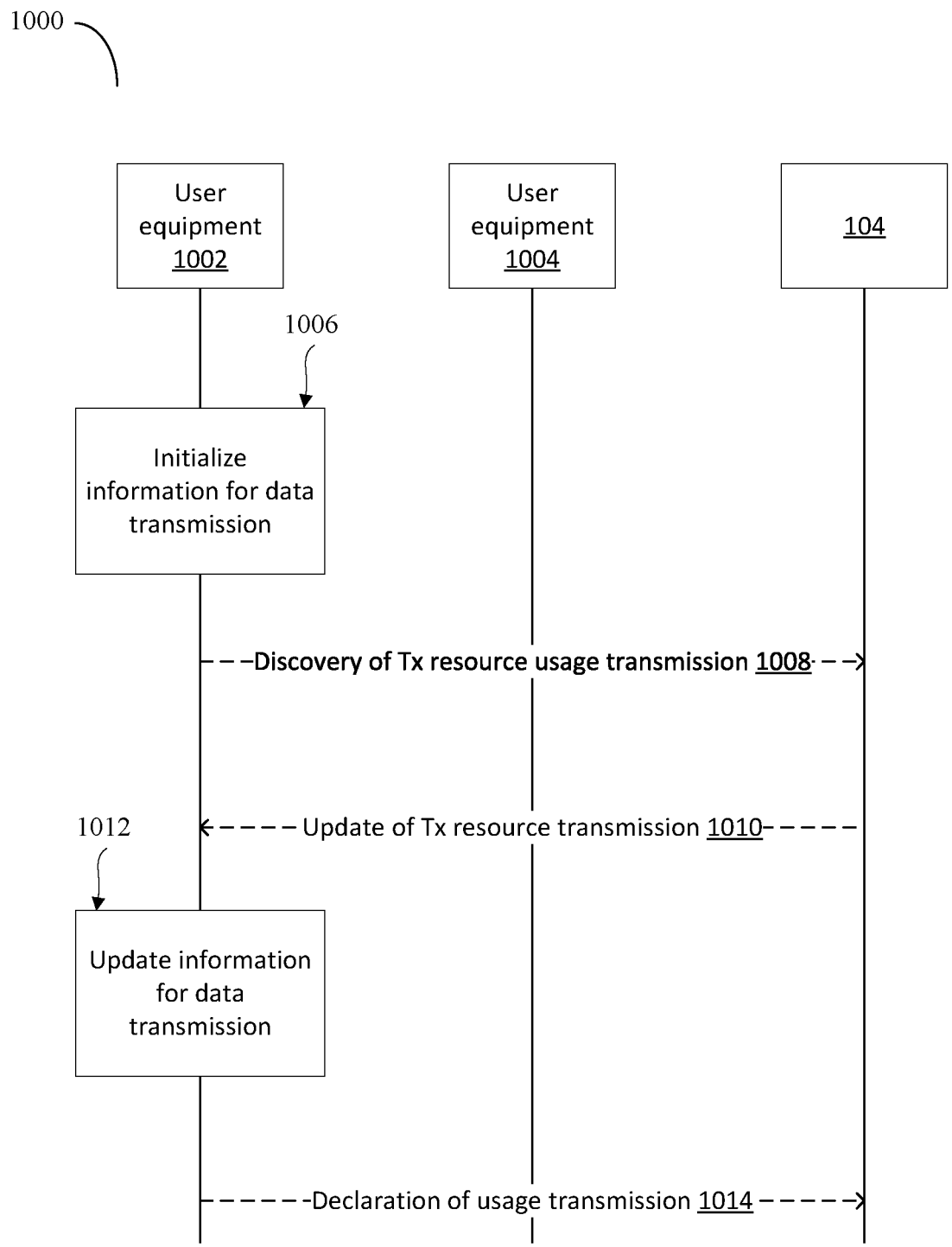
FIG. 10 illustrates an on-demand transmission to request data transmission information in accordance with one embodiment.

FIG. 10 illustrates a procedure 1000 for using on-demand control transmission to request data transmission information. A UE 1002 starts with uninitialized data transmission information. The UE 1002 sends a Discovery of Tx Resource Usage transmission 1008 to the data transmission resource manager 104. The data transmission resource manager 104 sends a response, such as an Update of Tx Resource transmission 1010, to the UE 1002. The UE 1002 utilizes the data transmission information included in the Update of Tx resource transmission 1010 to update (or initialized) 1012 its data transmission information. Later, when UE 1002 selects and uses a data transmission resource from the data transmission information for data transmissions (i.e., to transmit data, the UE 1002 transmits a Declaration of Usage transmission 1014 to the data transmission resource manager 104 to provide the data transmission information manager 104 with up-to-date data transmission information (i.e., up-to-date information regarding the usage of data transmission resources).

Figure 11:
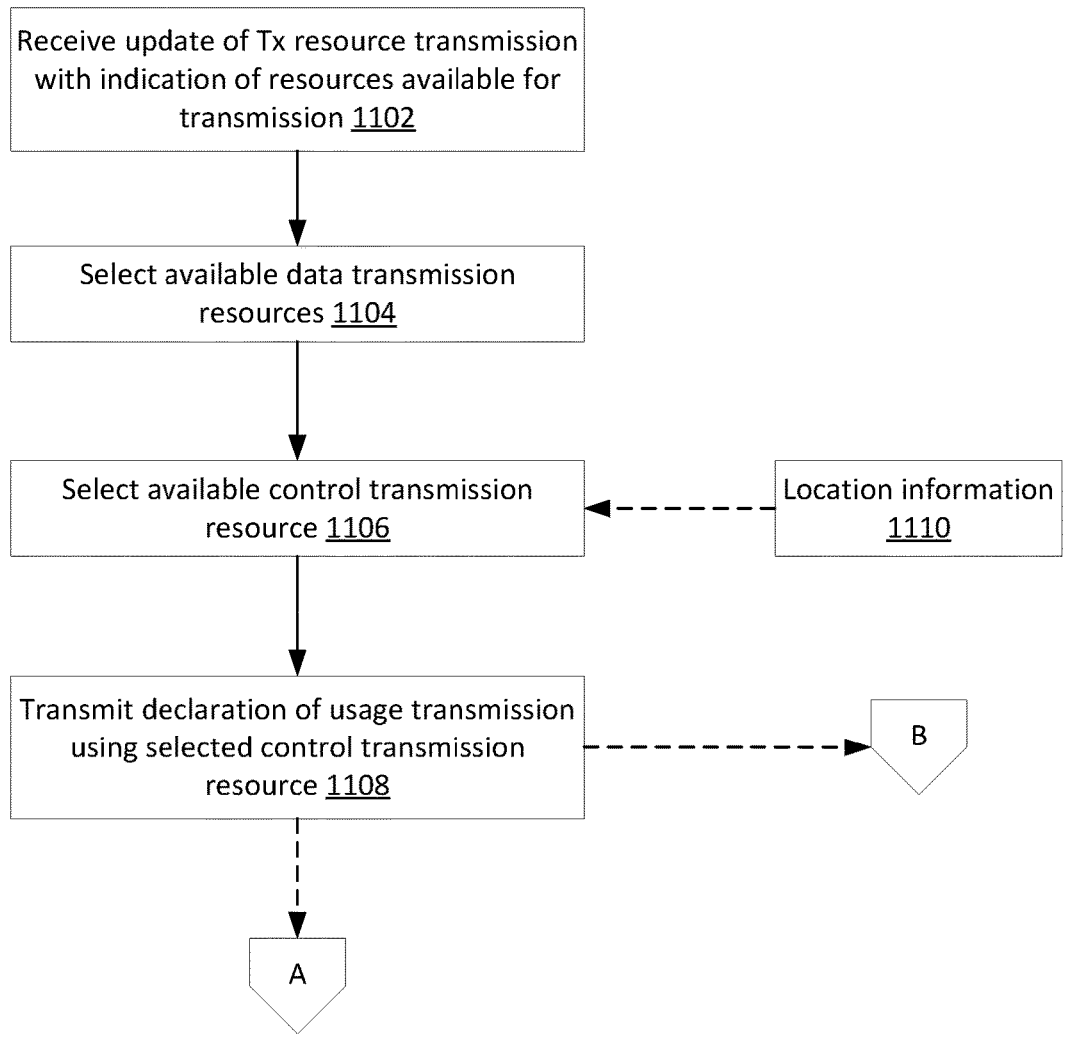
FIG. 11 illustrates a procedure used by user equipment to select and declare use of a data transmission resource in accordance with one embodiment.

FIG. 11 illustrates a procedure 1100 executed by a UE to select and declare the use of a data transmission resource. In block 1102, a UE receives an Update of Tx resource transmission that includes data transmission information indicative of data transmission resources that are available for data transmission. For example, the Update of Tx resource transmission may indicate which data transmission resources have been reserved, are in use, or both. The UE can then deduce that the remaining resource which are not reserved or in use are available. In block 1104, the UE selects at least one of the data transmission resources that are available for data transmissions based on the data transmission information. In block 1106, the UE selects one or more control transmission resources that are available for control transmissions based on control transmission information, where the control transmission information is indicative of the control transmission resources that are available for control transmissions. The selection of control transmission resources may be based on location information 1110 for the UE that indicates the geographic zone that the UE is located in, for example in accordance with S-MAP information. In block 1108, the UE transmits a Declaration of Usage transmission using the selected control transmission resources, where the transmission includes the data transmission resources that were selected by the UE for data transmissions. Selecting available data transmission resources 1104 can include selecting a data transmission resource which is currently unused in a given geographic zone, or selecting a data transmission resource which is currently used by a lower-priority UE in the given geographic zone.

Figure 12:
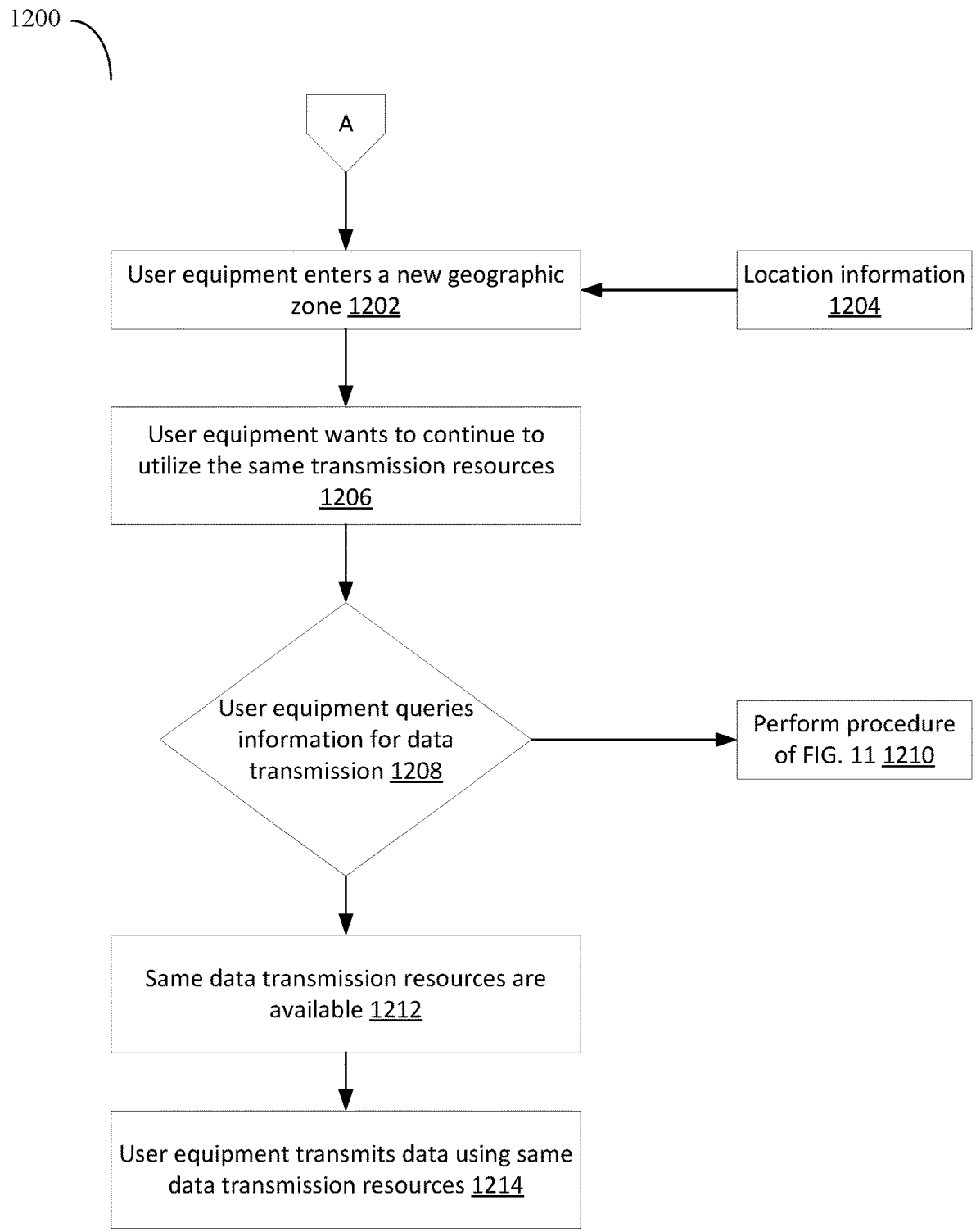
FIG. 12 illustrates a procedure to update data transmission resources when a user equipment enters a new geographic zone in accordance with one embodiment.

FIG. 12 illustrates a procedure 1200 to update data transmission resources when a UE enters a new geographic zone. In block 1202, the UE of FIG. 11 leaves the geographic zone in which it acquired data transmission resources and enters a new geographic zone. The determination of which geographic location the UE's is located in may be done using location information 1204 that includes global positioning satellite (GPS) coordinates of the UE. The location information 1204 may be obtained using, for example, a GPS receiver of the UE. In block 1206, the UE determines to continue to use these data transmission resources after it enters a new geographic zone. In decision block 1208, the UE queries its copy of data transmission information to determine if it is able to continue to use the same data transmission resources that it previously used. That is, the UE performs a query to verify that the previously determined data transmission resources may still be used in the new geographic zone. The query can involve consulting a locally stored Tx-RU-on-Use table or other locally stored data structure. In some embodiments, this query may involve sending a Discovery of Tx Resource Usage transmission. In some cases, continuing to use the same data transmission resources may lead to interference with other UE in the same or a nearby geographic zone. An intelligent function may be used by a UE to calculate potential interference with another UE in nearby geographic zones. In block 1210, if the UE is not able to continue to use the data transmission resources, it is required to perform the procedure of FIG. 11 in order to acquire new data transmission resources for the new geographic zone it now occupies. If the same data transmission resources are available (block 1212), the UE can continue to transmit data using those same data transmission resources.

Figure 13:
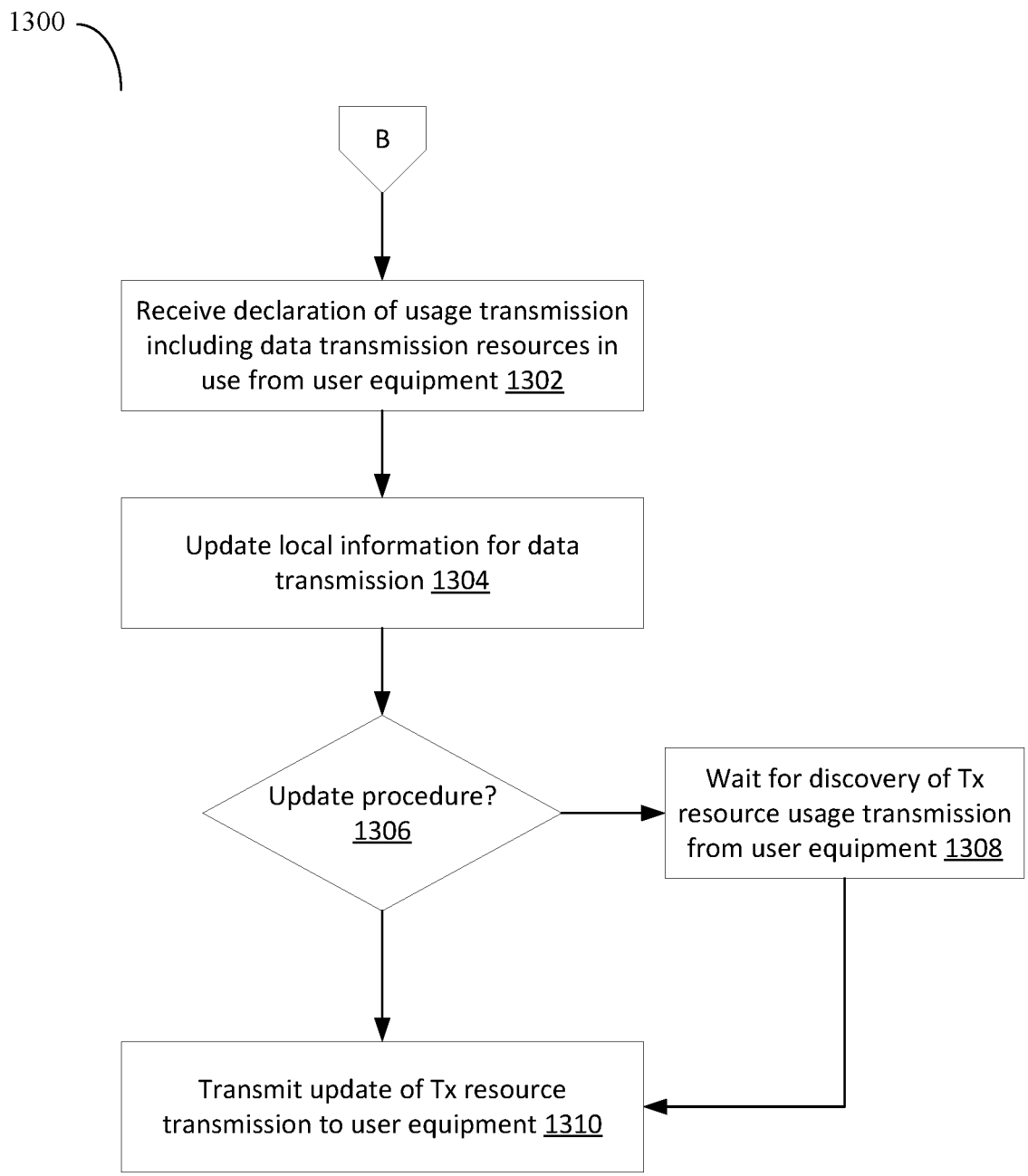
FIG. 13 illustrates a procedure used after receiving a "Declaration of Usage" transmission in accordance with one embodiment.

FIG. 13 illustrates a procedure 1300 used after receiving a Declaration of Usage transmission which may be performed by a data transmission resource manager 104 or a UE. After a UE transmits a Declaration of usage transmission as in block 1108 of FIG. 11, the data transmission resource manager 104 or UE receives the Declaration of usage transmission in block 1302. In block 1304, the data transmission resource manager 104 or UE updates its data transmission information with the data transmission information included in the Declaration of Usage transmission. Depending (as illustrated in block 1306) on the update procedure being used, such as periodic transmission of data transmission information procedure 900 of FIG. 9 or on-demand transmission to request data transmission information procedure 1000 of FIG. 10, the data transmission resource manager 104 or UE may either wait until it receives a Discovery of Tx Resource Usage transmission 1008 request (block 1308) and then transmit an Update of Tx Resource transmission, or a periodic Update of Tx resource transmission may be transmitted to any relevant UE (block 1310) that requires or requests data transmission information updates.

Figure 14:
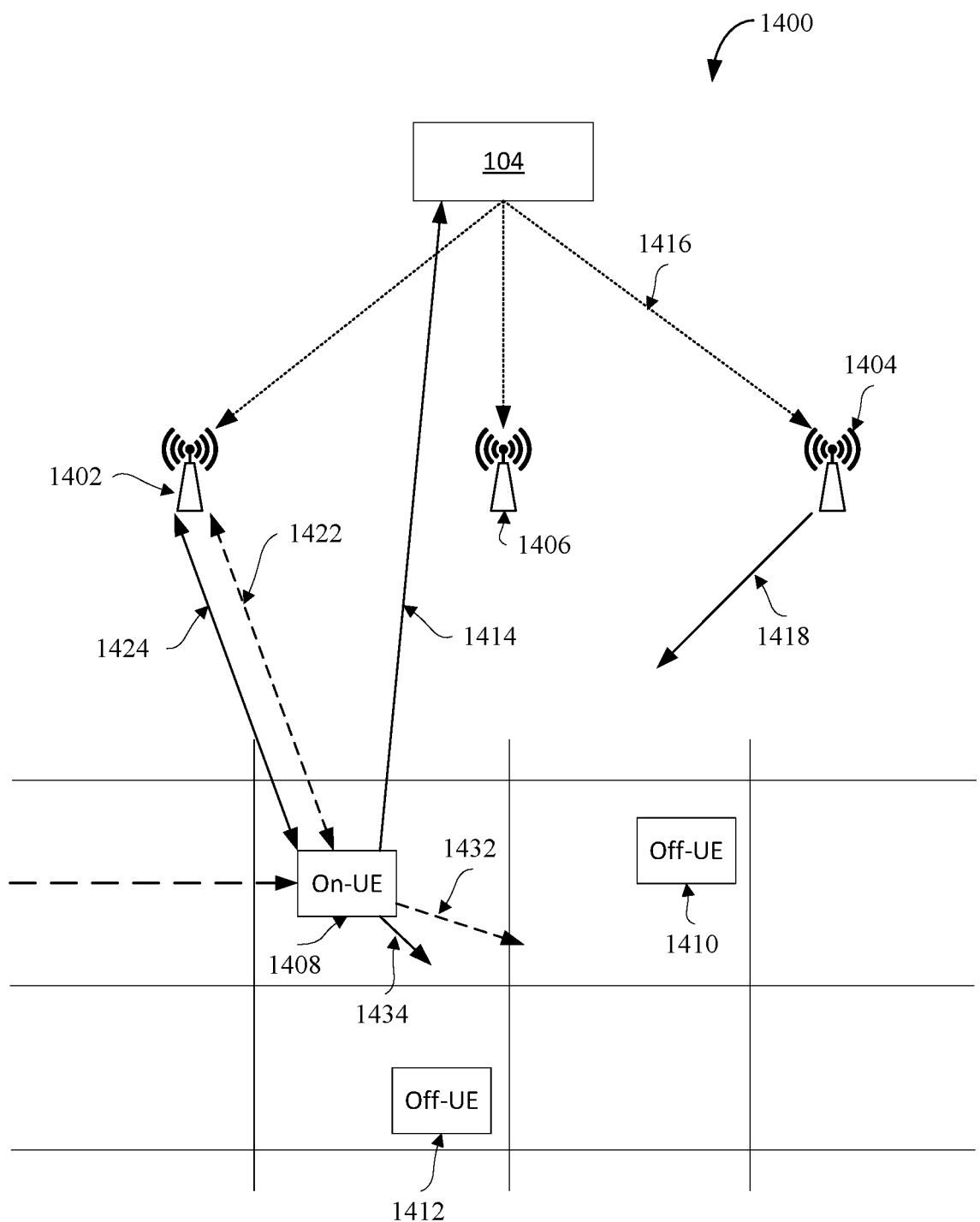
FIG. 14 illustrates a diagram of updating data transmission information in accordance with one embodiment.

FIG. 14 illustrates a procedure 1400 for updating data transmission information. In this embodiment, UE 1408 enters a new geographic zone and transmits a Declaration of Usage transmission 1414 to the data transmission resource manager 104. The data transmission resource manager 104 updates its data transmission information based on the data transmission information included in Declaration of Usage transmission 1414 received from UE 1408 and sends an update of Tx resource transmission 1416 to access nodes 1402, 1404, and 1406 which then transmits the Update of Tx resource transmission 1418 to UE 1408, UE 1410, and UE 1412. The Update of Tx resource transmission 1418 may be broadcast, multi-cast, or unicast to the UEs 1408, 1410, 1412 as required. UE 1410 and UE 1412 which are not currently transmitting update their local data transmission information copies for future use. The Declaration of Usage transmission 1414 and the Update of Tx Resource transmission 1418 are both instances of control transmissions. More generally, examples of control transmissions 1422 and data transmissions 1424 are illustrated between network node 1402 and UE 1408. General examples of control transmission 1432 and data transmissions 1434 from the UE 1408 toward one or more other UEs are also shown.

Note that Declaration of Usage transmission 1414, Update of Tx resource transmission 1416, and Update of Tx resource transmission 1418 are all control transmissions and are transmitted using control transmission information 400 using the procedures described above.

Figure 15:
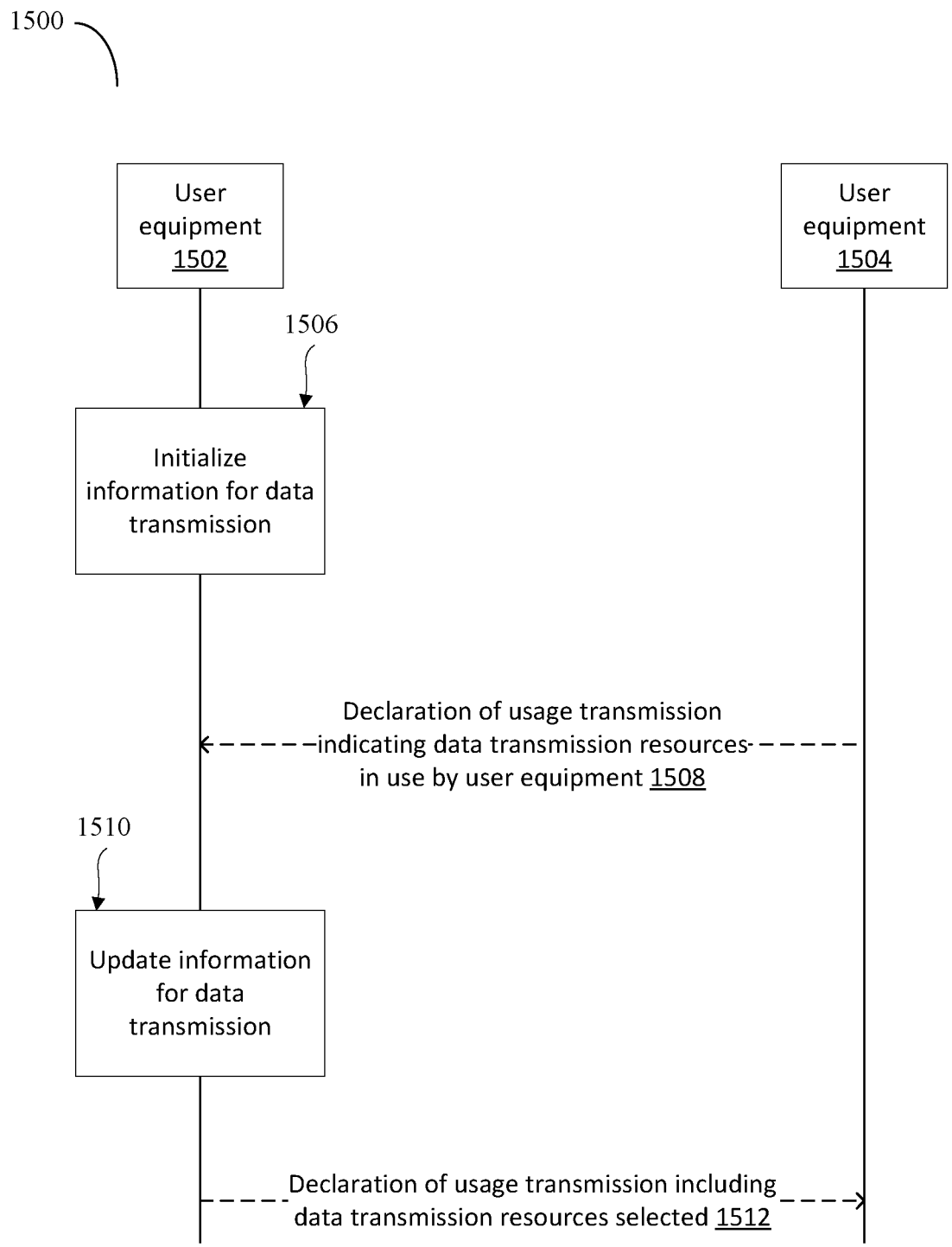
FIG. 15 illustrates an update data transmission information by monitoring control transmissions including data transmission resources in use in accordance with one embodiment.
Figure 16:
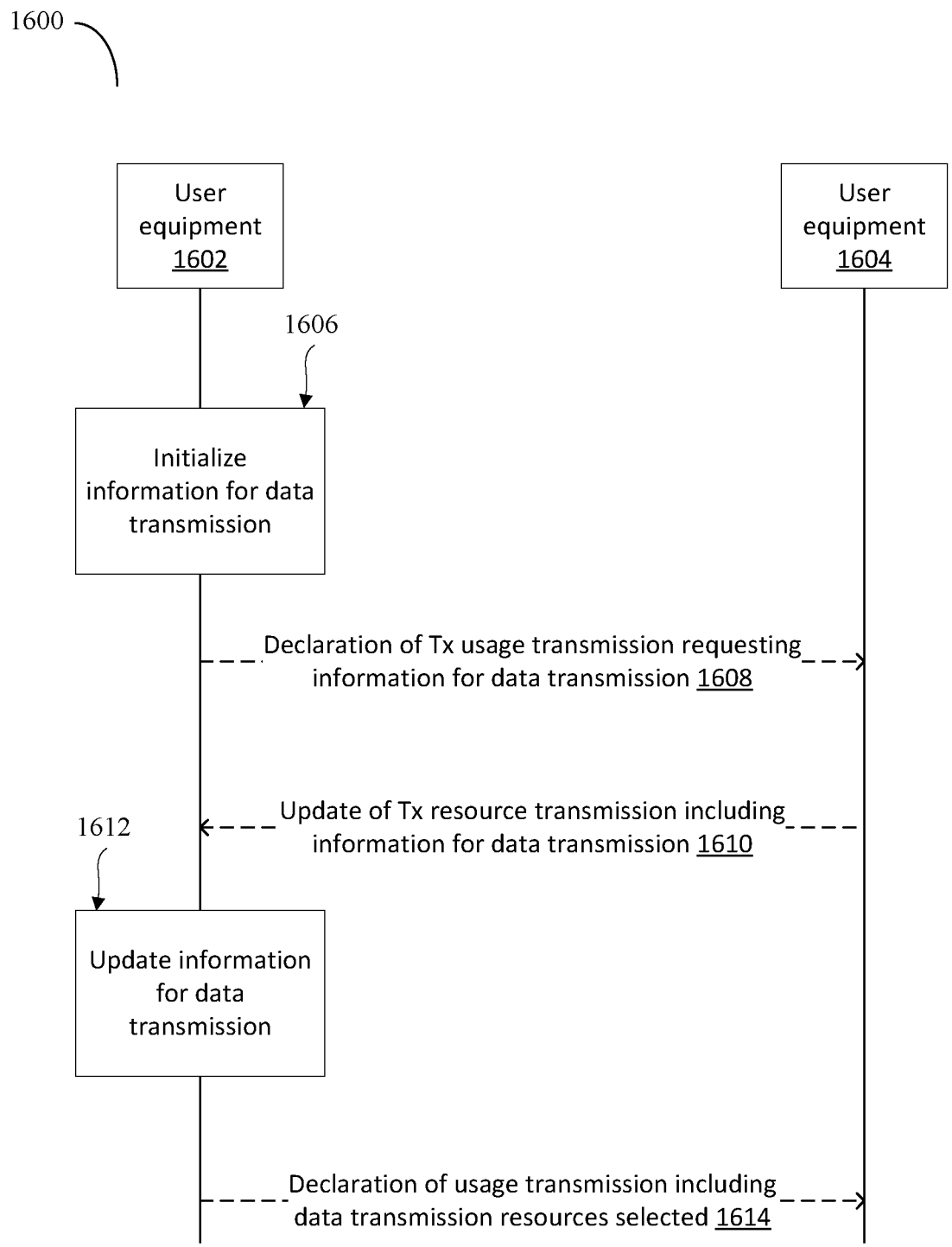
FIG. 16 illustrates a request for an update of the data transmission information from another user equipment in accordance with one embodiment.
Figure 17:
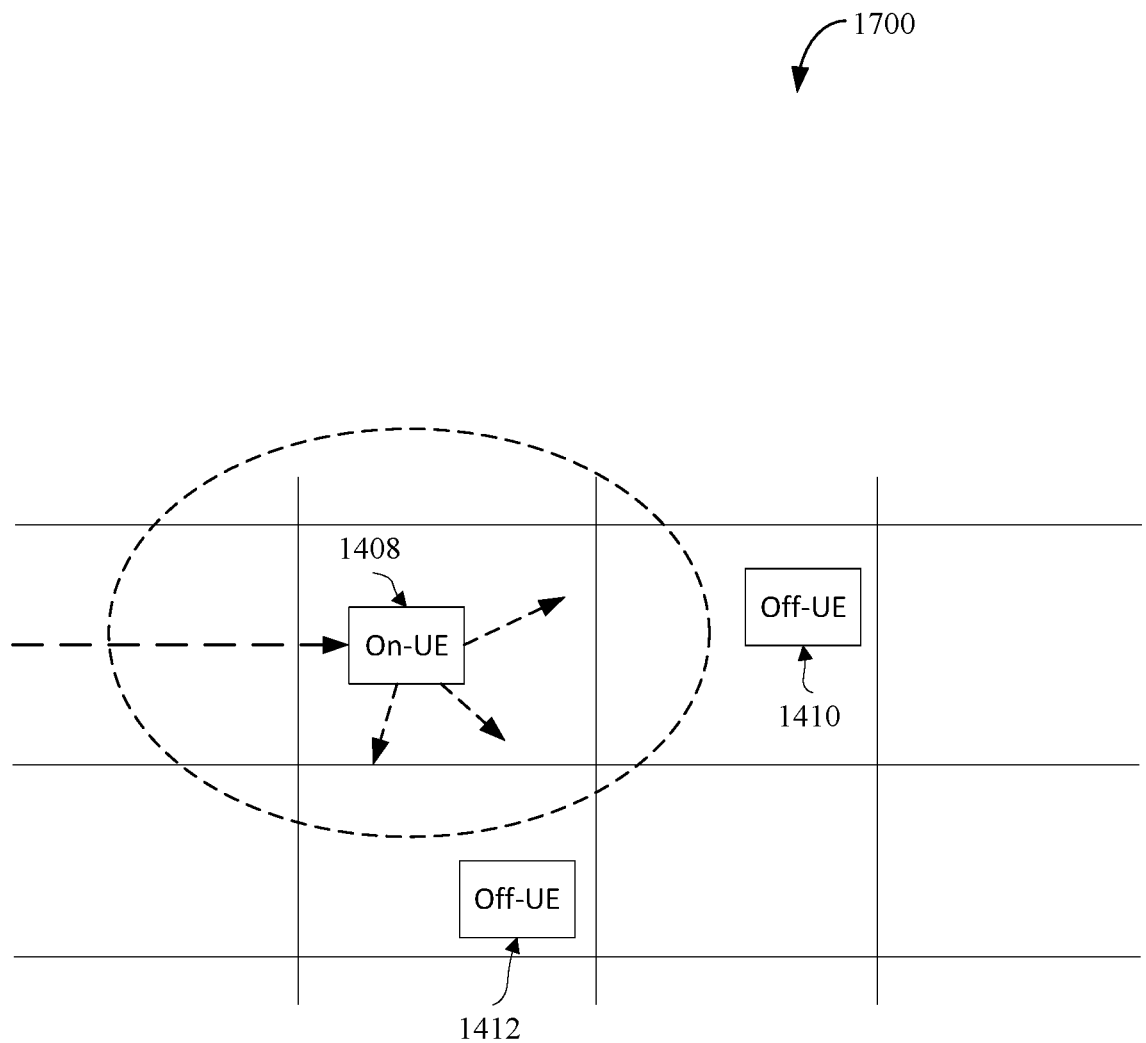
FIG. 17 illustrates a diagram of updating data transmission information in accordance with one embodiment.

FIG. 15, FIG. 16, and FIG. 17 illustrate how the data transmission information may be initialized and updated autonomously among a group with more than one UE without the assistance of a data transmission resource manager 104. Accordingly, embodiments of the present invention may be implemented even without using network infrastructure, by using peer-to-peer communication.

FIG. 15 illustrates how a UE may update data transmission information by monitoring control transmissions including data transmission resources in use. A UE 1502 initializes data transmission information (block 1506) as described above. The UE 1502 receives a Declaration of Usage transmission 1508 transmitted by another UE 1504. In this way, UE 1502 may obtain the latest data transmission information from its own and near-by geographic zones in order to update (block 1510) its local data transmission information. Using its local data transmission information, the UE 1502 may then autonomously select a data transmission resource as described above and transmit another Declaration of Usage transmission 1512 that may be monitored by UE 1504 and any other UE.

Note that Declaration of Usage transmission 1508 and Declaration of Usage transmission 1512 are both control transmissions and are transmitted using control transmission information 400 using the procedures described above.

FIG. 16 illustrates how a UE may request an update of the data transmission information from another UE. A UE 1602 initializes data transmission information (block 1606) as described above. A UE 1502 transmits a Discovery of Tx Resource Usage transmission 1608 to another UE 1604. In response to UE 1604 receiving Discovery of Tx Resource Usage transmission 1608 from UE 1602, UE 1604 transmits an Update of Tx resource transmission 1610 to UE 1602 that includes the data transmission information stored in the UE 1604. In this way, UE 1602 may obtain the latest data transmission resource usage status from its own and near-by geographic zones in order to update (block 1612) its local data transmission information. Using its control transmission information 400, UE 1602 may then autonomously select a transmission resource as described above and transmit a Declaration of Usage transmission 1614 that may be monitored by UE 1604 and any other UE.

Note that Discovery of Tx Resource Usage transmission 1608, Update of Tx resource transmission 1610, and Declaration of Usage transmission 1614 are all control transmissions and are transmitted using control transmission information 400 using the procedures described above.

FIG. 17 illustrates updating of data transmission information and usage of the updated data transmission information. A UE 1408 estimates possible interference with UE 1410 and UE 1412 that would result if UE 1408 selected a particular data transmission resource for the geographic zone it occupies as included in its data transmission information. Using this estimate, UE 1408 determines a data transmission resource to use for data transmissions. UE 1408 transmit a Declaration of Usage transmission to UEs 1410 and 1412 that includes an indication of the selected data transmission resource. In some embodiments, user equipment 1408 may also transmit a Declaration of Usage transmission in response to receiving a Discovery of Tx Resource Usage transmission with a geographic zone ID matching its current geographic zone. A UE which is not currently using any data transmission resource units (referred to as an Off-UE) may nonetheless be configured to continue to monitor control messages to track data transmission resource usage by other UEs. This allows the UE to select a data transmission resource unit for use when it determines to become an On-UE (i.e., a UE which uses or at least reserves data transmission resource units).

In FIG. 17, a non-transmitting UE such as UE 1410 and UE 1412 may maintain their own data transmission information by monitoring for Declaration of Usage transmissions from any other UE in the same or nearby geographic zones. A transmitting UE (e.g., UE 1408) planning to utilize data transmission resources when it enters a geographic zone may broadcast a Declaration of Usage transmission (which as described above is a control transmission) to any other UE in the geographic zone. UEs in receipt of such Declaration of Usage transmissions may update their locally stored data transmission information regarding what data transmission resources are potentially in use by other UEs and may thus cause collisions if used.

As described in detail above, UEs may obtain indications of data transmission resources currently prioritized to other (e.g., higher priority) UEs in a given geographic zone. This is performed for example by receiving control transmissions from other UEs, control transmissions from network infrastructure, or a combination thereof. Once this information is known, a UE is configured to reserve a data transmission resource by selecting a resource, from a pool, which is not currently prioritized to another UE in the given geographic zone. However, it is considered that, if required, a UE can select a data transmission resource that is currently in use, in the same geographic zone, by another lower priority UE. This may be performed for example if the UE is attempting to avoid switching from a data transmission resource which was used in an immediately prior geographic zone, in order to mitigate sidelink communication interruptions.

A UE may obtain the indications of data transmission resources currently prioritized to other (e.g., higher priority) UEs in a given geographic zone by one or a combination of means as described above. A UE may receive transmissions from network infrastructure indicative of the set of data transmission resources currently in use in the geographic zone, for example in the form of Update of Tx resource transmissions. A UE may receive control transmissions from other UEs, such as Declaration of Usage transmissions. Such control transmissions reserve data transmission resources in the geographic zone, for use by the other UEs. In some embodiments, the UE may transmit discovery messages (discovery of resource unit transmissions) requesting that the other UEs, or network infrastructure, indicate data transmission resources in use. The indications may be via Declaration of Usage transmissions or Update of Tx resource transmissions.

A UE may maintain an indication of usage of data transmission resources by other UEs in each of a plurality of the geographic zones. The UE may also maintain details of the usage, such as priority levels of the other UEs, usage times, number of UEs in a group, etc. The indications of data transmission resources currently prioritized to other (e.g., higher priority) UEs can then be based on the maintained indications and details of usage. For example, a UE be aware of which data transmission resources are used by other UEs, and priority information for those other UEs. The UE can then determine which data transmission resources are prioritized to other UEs based on a combination of this information. The UE can determine which UEs have higher priority than the UE and which UEs have lower priority than the UE. The data transmission resources being used by UEs with higher priority can be considered prioritized to other UEs and the UE may avoid reserving these resources. The data transmission resources being used by UEs with lower priority can be potentially reserved by the UE. However, the UE may be configured to transmit a control transmission reserving such a data transmission resource immediately, in order to prompt the UEs with lower priority to select a new data transmission resource. Accordingly, transmitting the control transmission reserving a data transmission resource may be performed immediately following a determination, by the UE, that the reservation is or will be successful.

Priority can be determined based on a designated priority level. Priority can be determined based on team (group or platoon) size. For example, UEs belonging to a larger team may be accorded a higher priority than UEs belonging to a smaller team. Priority can be determined based on an amount of time that a UE requires use of a data transmission resource. For example, UEs requiring use of a data transmission resource for a longer amount of time may be accorded a higher priority than UEs requiring use of the data transmission resource for a shorter amount of time.

Collisions may happen when more than one user equipment transmits simultaneously using the same data transmission resource. Collisions may cause interference at a receiving user equipment. Collisions may be detected during transmission by various network protocols. Collisions can be predicted by a user equipment based on the data transmission information, and parameters of communication requirements of the user equipment itself. Parameters may include communication distance and the location of a receiving user equipment. When it is determined that a collision has occurred or may occur, a user equipment may use a prioritization procedure to determine whether it needs to select an alternative data transmission resource or continue using the presently selected data transmission resource in order to avoid possible interference. Criteria for making this determination include different priority levels of service class or a size of a wireless entity group. Priority levels may be based on quality of service (QoS), quality of experience (QoE), service level agreements (SLA), contractual obligations or criteria.

Based on the rules, a user equipment can compare parameters such as service level, group size, and information with corresponding information in the data transmission information, and decide either to continue to use the same, selected data transmission or to select a new data transmission resource using the data transmission information.

In some embodiments, for example in response to a collision or collision resolution operation, a UE may determine that reservation of a data transmission resource is unsuccessful. In this case, the UE may transmit another control transmission reserving (or attempting to reserve) another data transmission resource.

In some embodiments, for example, in response to a collision resolution operation, a UE may determine that reservation of a data transmission resource is successful. This may include determining that the UE, out of plural UEs contending for (e.g., attempting to use or attempting to reserve) the data transmission resource, is prioritized to use the resource. The collision resolution operation may be decentralized in that each UE uses its own stored data to determine which UE is prioritized to use a resource. For example, each UE may determine whether a higher priority UE has declared its intent to use the same resource. Alternatively, the collision resolution operation may be performed by the network infrastructure.

Embodiments may be used where a user equipment is part of a platoon of vehicles where the leader user equipment may continuously send data to one or more team member user equipment in the platoon. In these cases, if some feedback from team member user equipment is required, a member user equipment can use a multi-hop or relay mechanism for sending back an acknowledgment (ACK/NACK) where transmission are relayed through one or more intermediate user equipment between the transmitting user equipment and the receiving user equipment.

Figure 18:
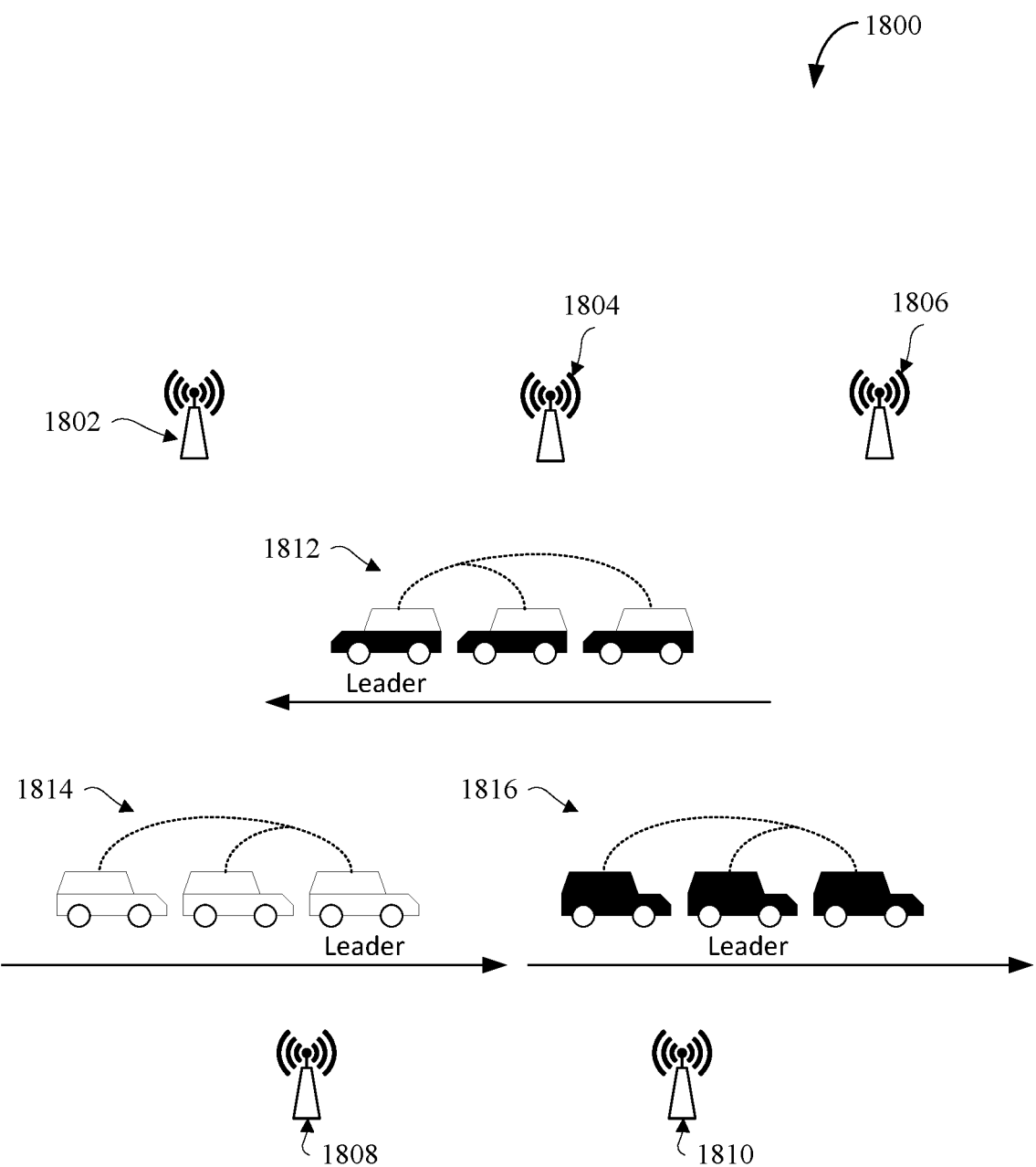
FIG. 18 illustrates co-travelling groups of UEs operating in accordance with an embodiment of the present invention.

FIG. 18 illustrates co-travelling groups of UEs, according to an embodiment of the present invention. Each UE is associated with a vehicle, and groups of vehicles may be regarded as platoons. UEs 1812, 1814, 1816 form a first platoon communicatively coupled together by communication sidelinks 1818. UEs 1822, 1824, 1826 form a second platoon communicatively coupled together by communication sidelinks 1828. UEs 1832, 1834, 1836 form a first platoon communicatively coupled together by communication sidelinks 1838. Network infrastructure nodes 1805 may be, but are not necessarily present. A particular geographic zone 1850 is shown for purposes of illustration. Direction of travel of the UEs is shown using arrows under corresponding groups of UEs. The sidelinks are used for data transmissions for example coordinating of the platoons (co-traveling UEs). The data transmission wireless resource units, which are selected as described herein, are used for sideline data communication between groups of co-travelling UEs.

In some embodiments, UEs 1812, 1822, 1832 can be considered leaders of their respective platoons. These UEs can be configured to reserve data transmission resources using control transmission resources as described herein, for example by transmitting Declaration of Usage transmissions. As an example, each UE 1812, 1822, 1832 may transmit a Declaration of Usage transmission upon entering the geographic zone 1850. Such a transmission serves to reserve a data transmission resource, and may either be received directly by other UEs or by network infrastructure nodes 1805 (when present), which then incorporate the information into subsequent Update of Tx resource transmissions.

The Declaration of Usage transmissions can also serve to notify other UEs in the same group of a proposed data transmission to use within the geographic zone being entered. For example, when UE 1822 makes a Declaration of Usage transmission, the other UEs 1824, 1826 can receive the transmission and self-configure to operate the communication sidelink 1828 using the resource indicated in this transmission. If one of the UEs, for example UE 1826 determines that the resource indicated in the transmission is not usable (e.g., due to interference with UE 1812 which might not be in range of UE 1822), then the UE 1826 may transmit an indication that usage of the resource is rejected. This may trigger the UE 1812 to perform a Declaration of Usage transmission with a different selected resource. Accordingly, a UE may determine that reservation of a data transmission resource is successful at least in part by determining that all its co-travelling UEs accept usage of the data transmission wireless resource unit in a given geographic zone. Different members of a group of UEs may thus perform messaging in order to cooperatively select a data transmission resource for use.

In some embodiments, different groups of UEs may have access to different pools of data transmission resource depending on their direction of travel. This can mitigate the chance that UEs using the same resource will encounter each other, which will require one of the UEs to switch resources. A plurality of different pools of data transmission wireless resource units may be defined, where each of the plurality of different pools is assigned for use by UEs travelling in a specified direction. A UE may then select a pool based on its direction of travel, and then select a data transmission resource from the selected pool. For example, UEs 1812 and 1822 may both select a data transmission resource from a first pool, while UE 1832 may select a data transmission resource from a second, different pool.

Embodiments of the present invention may be facilitated by the usage of network infrastructure. For example, network infrastructure may be used to receive Declaration of Usage transmissions (or other control transmissions reserving data transmission resources). The network infrastructure can then transmit Update of Tx Resource transmissions. In some embodiments, the network infrastructure can further be configured to perform one or more operations that would otherwise be performed by the UE. For example, the network infrastructure may be configured to transmit Declaration of Usage transmissions or other control transmissions reserving data transmission resources when a UE enters a geographic zone. The network infrastructure may define which data transmission resources are to be used by a given UE in a given geographic zone. The network may perform contention resolution or prioritization operations, or other actions that would other be performed by UEs. In such embodiments, an artificial intelligence (AI) entity or another computing entity may be used to direct network infrastructure actions.

Embodiments of the present invention can be performed without necessarily requiring network infrastructure. For example, UEs may transmit Declaration of Usage transmissions which are received and processed directly by other UEs. UEs may maintain records of resources currently used by other UEs based on such transmissions, which may include prioritization information. UEs may use Discovery of Tx Resource Usage transmissions to trigger Declaration of Usage transmissions.

In accordance with embodiments of the present invention, there is provided a method including receiving, by a user equipment, data transmission information indicative of data transmission resources that are available for data transmission. The method also includes transmitting, by the user equipment, a control transmission using one or more control transmission resources. The control transmission resources are selected based on control transmission information, which is indicative of the control transmission resources that are available for control transmissions. The control transmission includes an indication of one or more data transmission resources that were selected by the user equipment for data transmission based on data transmission information.

In some embodiments, the data transmission information is received in a second (incoming) control transmission received prior to the control transmission being transmitted by the user equipment.

Some embodiments include determining, by the user equipment, a geographic zone that the user equipment is located in, where the one or more control transmission resources are selected based on the geographic zone.

In some embodiments, the control transmission information is indicative of control transmission resources that are available in each one of a plurality of geographic zones.

Some embodiments include receiving a second control transmission including an indication of data transmission resources that were selected by a second (e.g., peer) user equipment for data transmission, and updating the data transmission information stored at the user equipment based on the indication of data transmission resources that were selected by the second user equipment for data transmission.

In some embodiments, the data transmission resources are selected based on a determination of potential interference at other wireless devices when the user equipment performs data transmissions. The determination of potential interference may be made based on the data transmission information.

In some embodiments, the data transmission information includes information indicative of a geographic zone in which the user equipment and a second user equipment are located. Selecting the at least one data transmission resource includes determining a data transmission resource that does not interfere with a second data transmission resource used by the second user equipment.

In some embodiments, the data transmission information is received from a data transmission information manager. In some embodiments, the data transmission information manager is instantiated in the core network, or an access node (e.g., in a base station) as a network function. The data transmission information manager may be implemented on a networked computing device having a computer processor operatively coupled to memory. This may be a physical device, or a virtual machine instantiated using one or more computing resources by a cloud service provider, for example.

In some embodiments, the data transmission information is received from a second UE.

In some embodiments, the data transmission information is received over an air interface.

Some embodiments include determining, by the user equipment, whether a potential collision will occur during data transmission based on a control transmission received from a second user equipment that includes data transmission resources that were selected by the second user equipment for data transmission and triggering a prioritization procedure in response to determining that a potential collision will occur during data transmission.

Some embodiments include the user equipment transmitting a second control transmission indicative of release of the data transmission resources that were selected by the user equipment for data transmission. Data transmission resources that are released can be used subsequently by the UE or other UE.

In some embodiments, the control transmission further includes information indicative of a geographic zone in which the user equipment is located and mobility information of the user equipment.

Some embodiments include receiving, by the user equipment, location information that indicates that the user equipment is located in a geographic zone that is different from an initial geographic zone pre-configured in the user equipment, the user equipment verifying that the data transmission resource may still be used. The data transmission resources may be selected based on data transformation information received when the user equipment is located in an initial geographic zone, and, following the user equipment moving to a geographic zone that is different from the initial geographic zone, the user equipment may transmit a query to verify that the data transmission resources may still be used.

In some embodiments, the data transmission information includes data transmission resources that are available for data transmissions in each one of a plurality of geographic zones, each of the plurality of geographic zones being identified by a zone ID.

In accordance with embodiments of the present invention, there is provided a user equipment that includes a processor and a memory. The memory stores instructions that, when executed by the processor, cause the user equipment to receive data transmission information indicative of data transmission resources that are available for data transmission and transmit a control transmission using one or more control transmission resources selected based on control transmission information indicative of the control transmission resources that are available for control transmissions, the control transmission including an indication of one or more data transmission resources that were selected by the user equipment for data transmission based on data transmission information. The user equipment may be configured to perform operations as described above with respect to the described method.

In accordance with embodiments of the present invention, there is provided non-transitory computer readable medium storing instructions executable in a processor of a user equipment. The instructions when executed in the processor cause the user equipment to receive data transmission information indicative of data transmission resources that are available for data transmission and transmit a control transmission using one or more control transmission resources selected based on control transmission information indicative of the control transmission resources that are available for control transmissions, the control transmission including an indication of one or more data transmission resources that were selected by the user equipment for data transmission based on data transmission information. The instructions may further cause the user equipment to perform operations as described above with respect to the described method.

Embodiments of the present invention may be used to reduce the overhead required to communicate with a resource manager for selecting resources for data transmissions, and in particular for selecting resources for sidelink data transmission.

Embodiments may also be used in situations where user equipment is not stationary and is mobile. A mobile UE may traverse across a number of geographic zones where the available data transmission resources or control transmission resources may vary from geographic zone to geographic zone.

Embodiments may also include methods to implement prioritization procedures in the case where two user equipment in close geographic proximity attempt to use the same data transmission resources within the same data transmission duration.

As used herein, the term "about" should be read as including variation from the nominal value, for example, a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method comprising, by an apparatus:
   receiving an indication of a set of geographic zones and a set of control transmission wireless resource units, wherein, for each one of the geographic zones, a corresponding one or more of the control transmission wireless resource units is specified for use while in said one of the geographic zones;
   while in a first zone of the geographic zones, transmitting a control transmission reserving a first data transmission wireless resource unit for use by the apparatus for sidelink (SL) data communication while in the first zone, the control transmission performed using one of the control transmission wireless resource units corresponding to the first zone, wherein said first data transmission wireless resource unit is selected from a pool of data transmission wireless resource units, each member of the pool of data transmission wireless resource units being available for use across a contiguous plurality of the set of geographic zones, wherein different members of the pool of data transmission wireless resource units are concurrently usable regardless of geographic zone; and
   following determining that reservation of the first data transmission wireless resource unit in the defined geographic zone is successful, using the first data transmission wireless resource unit for SL data communication while in the defined geographic zone.

2. The method of claim 1, wherein a plurality of different pools of data transmission wireless resource units are defined, each of the plurality of different pools assigned for use by apparatus travelling in a specified direction, the method further comprising selecting the pool from the plurality of pools based on a direction of travel of the apparatus.

3. The method of claim 1, wherein the first data transmission wireless resource unit is used for SL data communication with one or more other apparatus co-travelling with the apparatus.

4. The method of claim 1, wherein reserving the first data transmission wireless resource unit comprises preferentially reserving, as the first data transmission wireless resource unit, a same data transmission wireless resource unit which was also used by the apparatus in one of the geographic zones visited by the apparatus immediately prior to visiting the first geographic zone.

5. The method of claim 1, further comprising obtaining an indication of a set of data transmission wireless resource units currently prioritized to and in use by other apparatus in the first geographic zone, wherein reserving the first data transmission wireless resource unit comprises selecting the first data transmission wireless resource unit as a member of the pool of data transmission wireless resources outside of the set of data transmission wireless resource units currently prioritized to other apparatus in the first geographic zone.

6. The method of claim 5, wherein obtaining the indication of the set of data transmission wireless resource units currently prioritized to other apparatus in the first geographic zone comprises one or more of:
   receiving one or more transmissions from network infrastructure indicative of the set of data transmission wireless resource units currently in use in the first geographic zone;
   receiving control transmissions from said other apparatus, said control transmissions reserving members of the set of data transmission wireless resource units in the first geographic zone; and
   transmitting a discovery message requesting that one or more other apparatus indicate which data transmission wireless resource units are currently in use thereby in the first geographic zone, and receiving responses, from the one or more other apparatus, to the discovery message.

7. The method of claim 5, further comprising:
   maintaining an indication of usage of data transmission wireless resource units by other apparatus in each of a plurality of the geographic zones, and maintaining details of said usage, wherein said indication of the set of data transmission wireless resource units currently prioritized to other apparatus in the first geographic zone is based at least in part on said indication of usage of data transmission wireless resource units and the details of said usage.

8. The method of claim 5, wherein obtaining the indication of the set of data transmission wireless resource units currently prioritized to other apparatus in the first geographic zone comprises:
   obtaining an indication of a set of data transmission wireless resource units currently in use by other apparatus in the first geographic zone; and
   obtaining an indication of whether each of said other apparatus has higher priority or lower priority than the apparatus.

9. The method of claim 8, wherein the other apparatus have higher priority comprise one or more of:
- other apparatus with a designated priority level higher than a designated priority level of the apparatus;
- other apparatus belonging to a team which is larger than a team to which the apparatus belongs;
- other apparatus which require use of data transmission wireless resource units for a longer amount of time than the apparatus.

10. The method of claim 1, wherein the apparatus belongs to a plurality of co-travelling apparatus, and wherein determining that reservation of the first data transmission wireless resource unit in the defined geographic zone is successful comprises determining that all of the plurality of co-travelling apparatus accept usage of the first data transmission wireless resource unit in the defined geographic zone for use in data transmissions for coordination of the plurality of co-travelling apparatus.

11. The method of claim 1, further comprising determining that reservation of the first data transmission wireless resource unit in the defined geographic zone is unsuccessful, and following said determining that reservation of the first data transmission wireless resource unit in the defined geographic zone is unsuccessful, transmitting a second control transmission reserving a second data transmission wireless resource unit for use by the apparatus for sidelink (SL) data communication while in the first zone.

12. The method of claim 1, wherein determining that reservation of the first data transmission wireless resource unit in the defined geographic zone is successful comprises determining that the apparatus, out of a plurality of other apparatus contending for the first data transmission wireless resource unit, is prioritized to use the first data transmission wireless resource unit in the defined geographic zone under predetermined prioritization rules.

13. The method of claim 12, wherein said transmitting the control transmission reserving the first data transmission wireless resource unit is performed immediately following said determining that reservation of the first data transmission wireless resource unit in the defined geographic zone is successful.

14. An apparatus comprising a processor, a memory and a network interface and configured to:
- receive an indication of a set of geographic zones and a set of control transmission wireless resource units, wherein, for each one of the geographic zones, a corresponding one or more of the control transmission wireless resource units is specified for use while in said one of the geographic zones;
- while in a first zone of the geographic zones, transmit a control transmission reserving a first data transmission wireless resource unit for use by the apparatus for sidelink (SL) data communication while in the first zone, the control transmission performed using one of the control transmission wireless resource units corresponding to the first zone, wherein said first data transmission wireless resource unit is selected from a pool of data transmission wireless resource units, each member of the pool of data transmission wireless resource units being available for use across a contiguous plurality of the set of geographic zones, wherein different members of the pool of data transmission wireless resource units are concurrently usable regardless of geographic zone; and
- following determining that reservation of the first data transmission wireless resource unit in the defined geographic zone is successful, use the first data transmission wireless resource unit for SL data communication while in the defined geographic zone.

15. The apparatus of claim 14, wherein the first data transmission wireless resource unit is used for SL data communication with one or more other apparatus co-travelling with said apparatus.

16. The apparatus of claim 14, wherein reserving the first data transmission wireless resource unit comprises preferentially reserving, as the first data transmission wireless resource unit, a same data transmission wireless resource unit which was also used by the apparatus in one of the geographic zones visited by the apparatus immediately prior to visiting the first geographic zone.

17. The apparatus of claim 14, further configured to obtain an indication of a set of data transmission wireless resource units currently prioritized to other apparatus in the first geographic zone, wherein reserving the first data transmission wireless resource unit comprises selecting the first data transmission wireless resource unit as a member of the pool of data transmission wireless resources outside of the set of data transmission wireless resource units currently prioritized to other apparatus in the first geographic zone.

18. The apparatus of claim 14, wherein the apparatus belongs to a plurality of co-travelling apparatus, and wherein determining that reservation of the first data transmission wireless resource unit in the defined geographic zone is successful comprises determining that all of the plurality of co-travelling apparatus accept usage of the first data transmission wireless resource unit in the defined geographic zone for use in data transmissions for coordination of the plurality of co-travelling apparatus.

19. The apparatus of claim 14, wherein determining that reservation of the first data transmission wireless resource unit in the defined geographic zone is successful comprises determining that the apparatus, out of a plurality of apparatus contending for the first data transmission wireless resource unit, is prioritized to use the first data transmission wireless resource unit in the defined geographic zone under predetermined prioritization rules.

20. A non-transitory computer readable medium storing instructions executable in a processor of an apparatus, the apparatus also including a memory and a network interface, the instructions when executed in the processor cause the apparatus to:
- receive an indication of a set of geographic zones and a set of control transmission wireless resource units, wherein, for each one of the geographic zones, a corresponding one or more of the control transmission wireless resource units is specified for use while in said one of the geographic zones;
- while in a first zone of the geographic zones, transmit a control transmission reserving a first data transmission wireless resource unit for use by the apparatus for sidelink (SL) data communication while in the first zone, the control transmission performed using one of the control transmission wireless resource units corresponding to the first zone, wherein said first data transmission wireless resource unit is selected from a pool of data transmission wireless resource units, each member of the pool of data transmission wireless resource units being available for use across a contiguous plurality of the set of geographic zones, wherein different members of the pool of data transmission wireless resource units are concurrently usable regardless of geographic zone; and
- following determining that reservation of the first data transmission wireless resource unit in the defined geographic zone is successful, use the first data transmission wireless resource unit for SL data communication while in the defined geographic zone.

* * * * *